United States Patent
Kumar et al.

(10) Patent No.: US 7,548,975 B2
(45) Date of Patent: Jun. 16, 2009

(54) METHODS AND APPARATUS FOR IMPLEMENTING VIRTUALIZATION OF STORAGE WITHIN A STORAGE AREA NETWORK THROUGH A VIRTUAL ENCLOSURE

(75) Inventors: Sanjaya Kumar, Fremont, CA (US); Manas Barooah, San Jose, CA (US); John L. Burnett, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 701 days.

(21) Appl. No.: 10/045,883

(22) Filed: Jan. 9, 2002

(65) Prior Publication Data

US 2003/0131182 A1 Jul. 10, 2003

(51) Int. Cl.
*G06F 15/173* (2006.01)
*G06F 21/00* (2006.01)

(52) U.S. Cl. .................... 709/226; 709/223; 711/6

(58) Field of Classification Search ............... 709/224, 709/223, 226; 711/6
See application file for complete search history.

(56) References Cited

U.S. PATENT DOCUMENTS

| | | |
|---|---|---|
| 5,617,421 A | 4/1997 | Chin et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,999,930 A | 12/1999 | Wolff |
| 6,035,105 A | 3/2000 | McCloghrie et al. |
| 6,101,497 A | 8/2000 | Ofek |
| 6,148,414 A | 11/2000 | Brown et al. |
| 6,188,694 B1 | 2/2001 | Fine et al. |
| 6,202,135 B1 | 3/2001 | Kedem et al. |
| 6,208,649 B1 | 3/2001 | Kloth |

(Continued)

FOREIGN PATENT DOCUMENTS

JP 2000 242434 9/2000

(Continued)

OTHER PUBLICATIONS

Vuppala, Vibhavasu and Ni, Lionel M.: "Layer-3 Switching Using Virtual Network Ports," Computer Communications and Networks, 1999. Proceedings. Eight International Conference on Boston, MA, USA Oct. 11-13, 1999, Piscataway, NJ, USA, IEEE. ISBN: 0-7803-5794-9; pp. 642-648.

(Continued)

*Primary Examiner*—William C Vaughn, Jr.
*Assistant Examiner*—Ranodhi N Serrao
(74) *Attorney, Agent, or Firm*—Weaver Austin Villeneuve & Sampson LLP

(57) ABSTRACT

Methods and apparatus for implementing storage virtualization on a network device of a storage area network are disclosed. A virtual enclosure is created that has one or more virtual enclosure ports and is adapted for representing one or more virtual storage units. Each of the virtual storage units represents one or more physical storage locations on one or more physical storage units of the storage area network. Each of the virtual enclosure ports of the virtual enclosure is associated with a port of a network device within the storage area network. An address or identifier is then assigned to each of the virtual enclosure ports.

53 Claims, 14 Drawing Sheets

U.S. PATENT DOCUMENTS

| | | | |
|---|---|---|---|
| 6,209,059 B1 | 3/2001 | Ofer et al. | |
| 6,219,699 B1 | 4/2001 | McCloghrie et al. | |
| 6,226,771 B1 | 5/2001 | Hilla et al. | |
| 6,260,120 B1* | 7/2001 | Blumenau et al. | 711/152 |
| 6,266,705 B1 | 7/2001 | Ullum et al. | |
| 6,269,381 B1 | 7/2001 | St. Pierre et al. | |
| 6,269,431 B1 | 7/2001 | Dunham | |
| 6,295,575 B1 | 9/2001 | Blumenau et al. | |
| 6,400,730 B1 | 6/2002 | Latif et al. | |
| 6,542,961 B1 | 4/2003 | Matsunami et al. | |
| 6,683,883 B1 | 1/2004 | Czeiger et al. | |
| 6,772,231 B2 | 8/2004 | Reuter et al. | |
| 6,847,647 B1 | 1/2005 | Wrenn | |
| 6,850,955 B2 | 2/2005 | Sonoda et al. | |
| 6,880,062 B1 | 4/2005 | Ibrahim et al. | |
| 6,898,670 B2 | 5/2005 | Nahum | |
| 6,907,419 B1 | 6/2005 | Pesola et al. | |
| 6,952,734 B1 | 10/2005 | Gunlock et al. | |
| 6,978,300 B1 | 12/2005 | Beukema et al. | |
| 6,983,303 B2 | 1/2006 | Pellegrino et al. | |
| 6,986,015 B2 | 1/2006 | Testardi | |
| 7,200,144 B2* | 4/2007 | Terrell et al. | 370/389 |
| 7,237,045 B2 | 6/2007 | Beckmann et al. | |
| 7,269,168 B2 | 9/2007 | Roy et al. | |
| 7,277,431 B2 | 10/2007 | Walter et al. | |
| 7,353,305 B2 | 4/2008 | Pangal et al. | |
| 2002/0053009 A1* | 5/2002 | Selkirk et al. | 711/162 |
| 2002/0083120 A1* | 6/2002 | Soltis | 709/200 |
| 2002/0095547 A1* | 7/2002 | Watanabe et al. | 711/114 |
| 2002/0103889 A1* | 8/2002 | Markson et al. | 709/223 |
| 2002/0103943 A1* | 8/2002 | Lo et al. | 710/2 |
| 2002/0112113 A1* | 8/2002 | Karpoff et al. | 711/4 |
| 2002/0120741 A1* | 8/2002 | Webb et al. | 709/225 |
| 2003/0131105 A1 | 7/2003 | Czeiger et al. | |
| 2003/0159058 A1 | 8/2003 | Eguchi | |
| 2003/0185154 A1 | 10/2003 | Mullendore et al. | |
| 2003/0210686 A1* | 11/2003 | Terrell et al. | 370/389 |
| 2004/0030857 A1 | 2/2004 | Krakirian et al. | |
| 2004/0039939 A1 | 2/2004 | Cox et al. | |
| 2004/0057389 A1 | 3/2004 | Klotz et al. | |
| 2004/0088574 A1 | 5/2004 | Walter et al. | |
| 2005/0050211 A1 | 3/2005 | Kaul et al. | |
| 2005/0076113 A1 | 4/2005 | Klotz et al. | |
| 2005/0091426 A1 | 4/2005 | Horn et al. | |
| 2005/0117522 A1 | 6/2005 | Basavaiah et al. | |

FOREIGN PATENT DOCUMENTS

| | | |
|---|---|---|
| WO | WO 00/52576 | 9/2000 |
| WO | WO 01/80013 A1 | 10/2001 |
| WO | WO 03/084106 | 9/2003 |

OTHER PUBLICATIONS

Examiner's Communication (The First Office Action) dated Apr. 7, 2006, from corresponding Chinese Patent Application No. 02828446.1, Methods and Apparatus for Implementing Virtualization of Storage Within a Storage Area Network Through a Virtual Enclosure, English translation, 10 pages; and the non-translated original in Chinese, 10 pages. Total of 20 pages.

European Office Action dated Jun. 8, 2007 from corresponding European Application No. 02797469.0, 13 pgs.

PCT International Search Report dated Mar. 11, 2005 from related PCT Application No. PCT/US2003/00883.

U.S. Office Action dated Mar. 30, 2006 from related U.S. Appl. No. 10/242,374, 19 pages.

U.S. Office Action dated Oct. 2, 2006 from related U.S. Appl. No. 10/242,374, 19 pages.

U.S. Office Action dated Mar. 20, 2007 from related U.S. Appl. No. 10/242,374, 21 pages.

U.S. Office Action dated Aug. 29, 2007 from related U.S. Appl. No. 10/242,374, 21 pages.

U.S. Office Action dated Jan. 2, 2008 from related U.S. Appl. No. 10/242,374, 21 pages.

Monia et al., "IFCP-A Protocol for Internet Feibre Channel Networking", Dec. 2002, www.ietf.org/lid-abstracts.txt.

U.S. Office Action dated May 3, 2006 from related U.S. Appl. No. 10/726,269 16 pages.

U.S. Office Action dated Sep. 29, 2006 from related U.S. Appl. No. 10/726,269, 15 pages.

U.S. Office Action dated Jul. 16, 2007 from related U.S. Appl. No. 10/726,269, 16 pages.

"Fibre Channel—Fabric Generic Requirements (FC-FG)", Dec. 4, 1996, American National Standards Institute, Inc.

U.S. Office Action dated Nov. 14, 2007 from related U.S. Appl. No. 10/726,269, 16 pages.

International Search Report dated Oct. 22, 2004 from related PCT Application No. PCT/US02/41079, 6 pages.

Australian Office Action dated May 13, 2008 from related AU Application No. 2002361837, 3 pages.

U.S. Office Action dated Jun. 27, 2008 from related U.S. Appl. No. 10/726,269, 16 pages.

International Search Report dated May 23, 2006 from related PCT Application No. PCT/US2004/039904, 3 pages.

U.S. Final Office Action dated Aug. 19, 2008 from related U.S. Appl. No. 10/242,374, 21 pgs.

Examiner's Communication (The First Office Action) dated Jul. 4, 2008 from Chinese Patent Application No. 200480033685.4 English translation, 10 pages; and the non-translated original in Chinese, 10 pages.

European Office Action dated Jul. 16, 2008 from corresponding European Office Action No. 02797469.0, 10 pages.

Australian Office Action dated Oct. 9, 2008 from related AU Application No. 2004311001, 2 pages.

Japanese Office Action dated Dec. 9, 2008 from related Japanese Patent Application No. 2003-560717.

Vibhavasu Vuppala, et al., "Layer-3 Switching Using Virtual Network Ports", *Computer Communications and Networks*, 1999, Proceedings, 8th International Conference, Boston, MA.

U.S. Office Action dated Jan. 7, 2009 from U.S. Appl. No. 10/726,269, 16 pages.

* cited by examiner

METHODS AND APPARATUS FOR IMPLEMENTING VIRTUALIZATION OF STORAGE WITHIN A STORAGE AREA NETWORK THROUGH A VIRTUAL ENCLOSURE

BACKGROUND OF THE INVENTION

1. Field of the Invention

The present invention relates to network technology. More particularly, the present invention relates to methods and apparatus for supporting virtualization of storage within a storage area network.

2. Description of the Related Art

In recent years, the capacity of storage devices has not increased as fast as the demand for storage. Therefore a given server or other host must access multiple, physically distinct storage nodes (typically disks). In order to solve these storage limitations, the storage area network (SAN) was developed. Generally, a storage area network is a high-speed special-purpose network that interconnects different data storage devices and associated data hosts on behalf of a larger network of users. However, although a SAN enables a storage device to be configured for use by various network devices and/or entities within a network, data storage needs are often dynamic rather than static.

FIG. 1A illustrates an exemplary conventional storage area network. More specifically, within a storage area network 102, it is possible to couple a set of hosts (e.g., servers or workstations) 104, 106, 108 to a pool of storage devices (e.g., disks). In SCSI parlance, the hosts may be viewed as "initiators" and the storage devices may be viewed as "targets." A storage pool may be implemented, for example, through a set of storage arrays or disk arrays 110, 112, 114. Each disk array 110, 112, 114 further corresponds to a set of disks. In this example, first disk array 110 corresponds to disks 116, 118, second disk array 112 corresponds to disk 120, and third disk array 114 corresponds to disks 122, 124. Rather than enabling all hosts 104-108 to access all disks 116-124, it is desirable to enable the dynamic and invisible allocation of storage (e.g., disks) to each of the hosts 104-108 via the disk arrays 110, 112, 114. In other words, physical memory (e.g., physical disks) may be allocated through the concept of virtual memory (e.g., virtual disks). This allows one to connect heterogeneous initiators to a distributed, heterogeneous set of targets (storage pool) in a manner enabling the dynamic and transparent allocation of storage.

The concept of virtual memory has traditionally been used to enable physical memory to be virtualized through the translation between physical addresses in physical memory and virtual addresses in virtual memory. Recently, the concept of "virtualization" has been implemented in storage area networks through various mechanisms. Virtualization interconverts physical storage and virtual storage on a storage network. The hosts (initiators) see virtual disks as targets. The virtual disks represent available physical storage in a defined but somewhat flexible manner. Virtualization provides hosts with a representation of available physical storage that is not constrained by certain physical arrangements/allocation of the storage.

One early technique, Redundant Array of Independent Disks (RAID), provides some limited features of virtualization. Various RAID subtypes have been implemented. In RAID1, a virtual disk may correspond to two physical disks 116, 118 which both store the same data (or otherwise support recovery of the same data), thereby enabling redundancy to be supported within a storage area network. In RAID0, a single virtual disk is striped across multiple physical disks. Some other types of virtualization include concatenation, sparing, etc. Some aspects of virtualization have recently been achieved through implementing the virtualization function in various locations within the storage area network. Three such locations have gained some level of acceptance: virtualization in the hosts (e.g., 104-108), virtualization in the disk arrays or storage arrays (e.g., 110-114), and virtualization in a storage appliance 126 separate from the hosts and storage pool. Unfortunately, each of these implementation schemes has undesirable performance limitations.

Virtualization in the storage array is one of the most common storage virtualization solutions in use today. Through this approach, virtual volumes are created over the storage space of a specific storage subsystem (e.g., disk array). Creating virtual volumes at the storage subsystem level provides host independence, since virtualization of the storage pool is invisible to the hosts. In addition, virtualization at the storage system level enables optimization of memory access and therefore high performance. However, such a virtualization scheme typically will allow a uniform management structure only for a homogenous storage environment and even then only with limited flexibility. Further, since virtualization is performed at the storage subsystem level, the physical-virtual limitations set at the storage subsystem level are imposed on all hosts in the storage area network. Moreover, each storage subsystem (or disk array) is managed independently. Virtualization at the storage level therefore rarely allows a virtual volume to span over multiple storage subsystems (e.g., disk arrays), thus limiting the scalability of the storage-based approach.

When virtualization is implemented on each host, it is possible to span multiple storage subsystems (e.g., disk arrays). A host-based approach has an additional advantage, in that a limitation on one host does not impact the operation of other hosts in a storage area network. However, virtualization at the host-level requires the existence of a software layer running on each host (e.g., server) that implements the virtualization function. Running this software therefore impacts the performance of the hosts running this software. Another key difficulty with this method is that it assumes a prior partitioning of the available storage to the various hosts. Since such partitioning is supported at the host-level and the virtualization function of each host is performed independently of the other hosts in the storage area network, it is difficult to coordinate storage access across the hosts. The host-based approach therefore fails to provide an adequate level of security. Due to this security limitation, it is difficult to implement a variety of redundancy schemes such as RAID which require the "locking" of memory during read and write operations. In addition, when mirroring is performed, the host must replicate the data multiple times, increasing its input-output and CPU load, and increasing the traffic over the SAN.

Virtualization in a storage area network appliance placed between the hosts and the storage solves some of the difficulties of the host-based and storage-based approaches. The storage appliance globally manages the mapping and allocation of physical storage to virtual volumes. Typically, the storage appliance manages a central table that provides the current mapping of physical to virtual. Thus, the storage appliance-based approach enables the virtual volumes to be implemented independently from both the hosts and the storage subsystems on the storage area network, thereby providing a higher level of security. Moreover, this approach supports virtualization across multiple storage subsystems. The key drawback of many implementations of this architecture is that every input/output (I/O) of every host must be sent through the storage area network appliance, causing significant performance degradation and a storage area network bottleneck. This is particularly disadvantageous in systems supporting a redundancy scheme such as RAID, since data must be mirrored across multiple disks. In another storage appliance-based approach, the appliance makes sure that all hosts receive the current version of the table. Thus, in order to enable the hosts to receive the table from the appliance, a software shim from the appliance to the hosts is required, adding to the complexity of the system. Moreover, since the software layer is implemented on the host, many of the disadvantages of the host-based approach are also present.

In view of the above, it would be desirable if various storage devices or portions thereof could be logically and dynamically assigned to various devices and/or entities within a network. Moreover, it would be beneficial if such a mechanism could be implemented to support the virtualization of storage within a SAN without the disadvantages of traditional virtualization approaches.

SUMMARY OF THE INVENTION

Methods and apparatus for implementing virtualization of storage in a storage area network are disclosed. This is accomplished through the use of one or more network devices capable of being placed in a data path between the hosts and the storage devices. As a result, neither the storage devices nor the hosts require additional software or hardware to support storage virtualization. Thus, the present invention is superior to the host based approach, which requires that each host be burdened by additional software to implement virtualization functionality. Moreover, the present invention enables multiple network devices to simultaneously manage the virtualization of various storage devices. Importantly, switch-based virtualization may be implemented on a per port basis. Any number of ports on a switch can manage virtualization of its own traffic. This allows a network's virtualization capacity to scale with the number of ports. Since there are large numbers of ports in any network system, there will nearly always be sufficient bandwidth for virtualization. Accordingly, virtualization of storage may be achieved without many of the drawbacks present in conventional virtualization schemes.

In accordance with one aspect of the invention, a virtual enclosure is created that has one or more virtual enclosure ports and is adapted for representing one or more virtual storage units. In other words, the virtual enclosure serves to "enclose" selected virtual storage units, which may be accessed via the virtual enclosure ports. Each of the virtual storage units represents one or more physical storage locations on one or more physical storage units of the storage area network. In addition, each of the virtual enclosure ports of the virtual enclosure is associated with a port of a network device within the storage area network. An address or identifier is then assigned to each of the virtual enclosure ports. For instance, the address or identifier may be a Fibre Channel identifier (FCID). Thus, a message (e.g., packet or frame) directed to a virtual enclosure port (or its assigned address/identifier) may be handled by the port associated with the virtual enclosure port.

In accordance with various embodiments of the invention, a virtual enclosure is implemented within a Fibre channel network. Thus, a Node World Wide Name (NWWN) is associated with the virtual enclosure. In addition, a Port World Wide Name (PWWN) is associated with each virtual enclosure port.

In accordance with another aspect of the invention, a port of a network device within the storage area network is instructed to handle messages on behalf of a virtual enclosure port. This may be accomplished in two ways. First, the port may be instructed to "bind" itself to the virtual enclosure port. In other words, the port acts as the virtual enclosure port, and all messages directed to the virtual enclosure port and received by the port are handled by that port. Second, the port may be instructed to serve as a "trapping port." More particularly, in addition to the port that is bound to the virtual enclosure port, one or more additional ports may also handle messages they receive that are directed to the virtual enclosure port. A trapping port is preferably a port that is directly connected to a host, and therefore can track those requests received by it as well as the responses associated with those requests. Binding and trapping among multiple ports on behalf of a single virtual enclosure port is preferably coordinated at a central location such as a virtual enclosure server.

Various network devices may be configured or adapted for performing the disclosed virtualization processes. These network devices include, but are not limited to, servers (e.g., hosts), routers, and switches. Moreover, the functionality for the above-mentioned virtualization processes may be implemented in software as well as hardware.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, packets and frames having the format described herein and provided on appropriate media are part of this invention.

These and other features of the present invention will be described in more detail below in the detailed description of the invention and in conjunction with the following figures.

DETAILED DESCRIPTION OF THE PREFERRED EMBODIMENTS

Figure 1A:
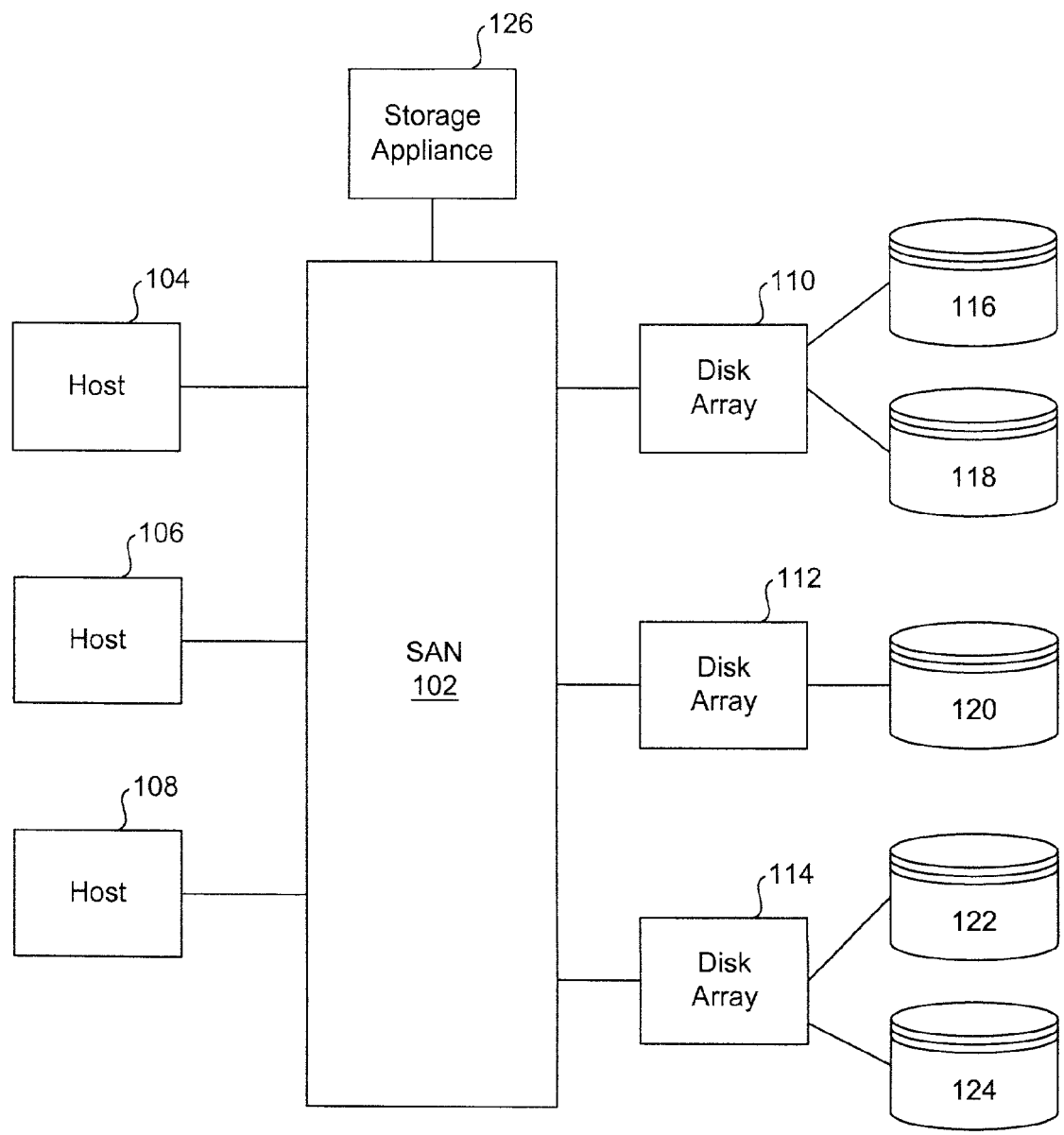
FIG. 1A is a block diagram illustrating an exemplary conventional storage area network capable of implementing various embodiments of prior art virtualization functions.

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

In accordance with various embodiments of the present invention, virtualization of storage within a storage area network may be implemented through the creation of a virtual enclosure having one or more virtual enclosure ports. The virtual enclosure is implemented, in part, by one or more network devices, which will be referred to herein as virtualization switches. More specifically, a virtualization switch, or more specifically, a virtualization port within the virtualization switch, may handle messages such as packets or frames on behalf of one of the virtual enclosure ports. Thus, embodiments of the invention may be applied to a packet or frame directed to a virtual enclosure port, as will be described in further detail below. For convenience, the subsequent discussion will describe embodiments of the invention with respect to frames. Switches act on frames and use information about SANs to make switching decisions.

Note that the frames being received and transmitted by a virtualization switch possess the frame format specified for a standard protocol such as Ethernet or fibre channel. Hence, software and hardware conventionally used to generate such frames may be employed with this invention. Additional hardware and/or software is employed to modify and/or generate frames compatible with the standard protocol in accordance with this invention. Those of skill in the art will understand how to develop the necessary hardware and software to allow virtualization as described below.

Obviously, the appropriate network devices should be configured with the appropriate software and/or hardware for performing virtualization functionality. Of course, all network devices within the storage area network need not be configured with the virtualization functionality. Rather, selected switches and/or ports may be configured with or adapted for virtualization functionality. Similarly, in various embodiments, such virtualization functionality may be enabled or disabled through the selection of various modes. Moreover, it may be desirable to configure selected ports of network devices as virtualization-capable ports capable of performing virtualization, either continuously, or only when in a virtualization enabled state.

The standard protocol employed in the storage area network (i.e., the protocol used to frame the data) will typically, although not necessarily, be synonymous with the "type of traffic" carried by the network. As explained below, the type of traffic is defined in some encapsulation formats. Examples of the type of traffic are typically layer 2 or corresponding layer formats such as Ethernet, Fibre channel, and InfiniBand.

As described above, a storage area network (SAN) is a high-speed special-purpose network that interconnects different data storage devices with associated network hosts (e.g., data servers or end user machines) on behalf of a larger network of users. A SAN is defined by the physical configuration of the system. In other words, those devices in a SAN must be physically interconnected.

Figure 1B:
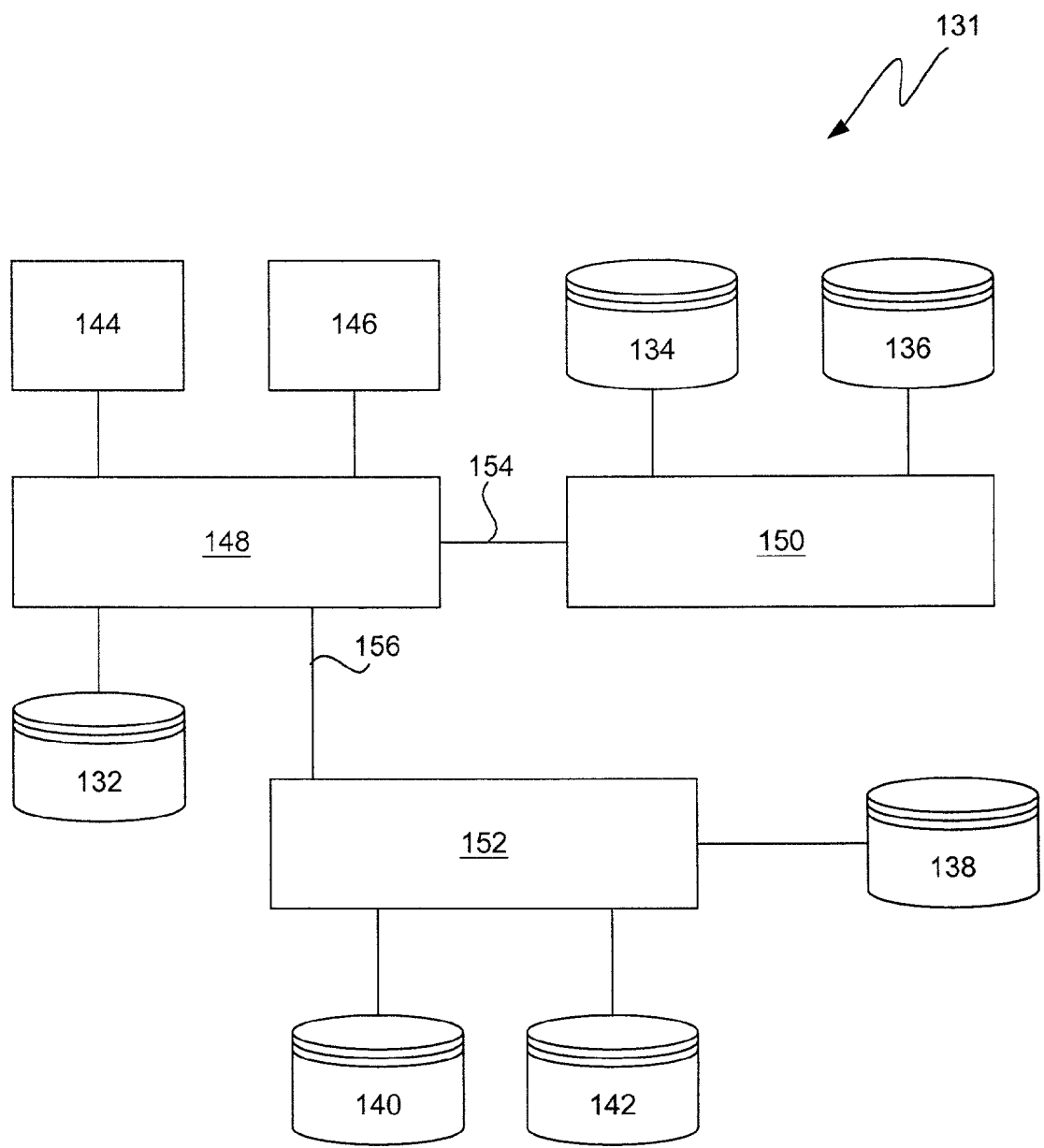
FIG. 1B is a block diagram illustrating an exemplary storage area network in which various embodiments of the invention may be implemented.

Within a storage area network 131 such as that illustrated in FIG. 1B, various storage devices 132, 134, 136, 138, 140, and 142 may be implemented, which may be homogeneous (e.g., identical device types, sizes, or configurations) as well as heterogeneous (e.g., different device types, sizes or configurations). Data may be read from, as well as written to, various portions of the storage devices 132-142 in response to commands sent by hosts 144 and 146. Communication among the storage devices and hosts is accomplished by coupling the storage devices and hosts together via one or more switches, routers, or other network nodes configured to perform a switching function. In this example, switches 148, 150, and 152 communicate with one another via interswitch links 154 and 156.

As indicated above, this invention pertains to "virtualization" in storage networks. Unlike prior methods, virtualization in this invention is implemented through the creation and implementation of a virtual enclosure. This is accomplished, in part, through the use of switches or other "interior" network nodes of a storage area network to implement the virtual enclosure. Further, the virtualization of this invention typically is implemented on a per port basis. In other words, a multi-port virtualization switch will have virtualization separately implemented on one or more of its ports. Individual ports have dedicated logic for handing the virtualization functions for packets or frames handled by the individual ports. This allows virtualization processing to scale with the number of ports, and provides far greater bandwidth for virtualization than can be provided with host based or storage based virtualization schemes. In such prior art approaches the number of connections between hosts and the network fabric or between storage nodes and the network fabric are limited—at least in comparison to the number of ports in the network fabric.

In a specific and preferred embodiment of the invention, the virtualization logic is separately implemented at individual ports of a given switch—rather than having centralized processing for all ports of a switch. This allows the virtualization processing capacity to be closely matched with the exact needs of the switch (and the virtual enclosure) on a per port basis. If a central processor is employed for the entire switch (serving numerous ports), the processor must be designed/selected to handle maximum traffic at all ports. For many applications, this represents extremely high processing requirements and a very large/expensive processor. If the central processor is too small, the switch will at times be unable to keep up with the switching/virtualization demands of the network.

Virtualization may take many forms. In general, it may be defined as logic or procedures that inter-relate physical storage and virtual storage on a storage network. Hosts see a representation of available physical storage that is not constrained by the physical arrangements or allocations inherent in that storage. One example of a physical constraint that is transcended by virtualization includes the size and location of constituent physical storage blocks. For example, logical units as defined by the Small Computer System Interface (SCSI) standards come in precise physical sizes (e.g., 36 GB and 72 GB). Virtualization can represent storage in virtual logical units that are smaller or larger than the defined size of a physical logical unit. Further, virtualization can present a virtual logical unit comprised of regions from two or more different physical logical units, sometimes provided on devices from different vendors. Preferably, the virtualization operations are transparent to at least some network entities (e.g., hosts).

In some general ways, virtualization on a storage area network is similar to virtual memory on a typical computer system. Virtualization on a network, however, brings far greater complexity and far greater flexibility. The complexity arises directly from the fact that there are a number of separately interconnected network nodes. Virtualization must span these nodes. The nodes include hosts, storage subsystems, and switches (or comparable network traffic control devices such as routers). Often the hosts and/or storage subsystems are heterogeneous, being provided by different vendors. The vendors may employ distinctly different protocols (standard protocols or proprietary protocols). Thus, in many cases, virtualization provides the ability to connect heterogeneous initiators (e.g., hosts or servers) to a distributed, heterogeneous set of targets (storage subsystems), enabling the dynamic and transparent allocation of storage.

Examples of network specific virtualization operations include the following: RAID 0 through RAID 5, concatenation of memory from two or more distinct logical units of physical memory, sparing (auto-replacement of failed physical media), remote mirroring of physical memory, logging information (e.g., errors and/or statistics), load balancing among multiple physical memory systems, striping (e.g., RAID 0), security measures such as access control algorithms for accessing physical memory, resizing of virtual memory blocks, Logical Unit (LUN) mapping to allow arbitrary LUNs to serve as boot devices, backup of physical memory (point in time copying), and the like. These are merely examples of virtualization functions. This invention is not limited to this full set or any particular subset thereof.

In some of the discussion herein, the functions of virtualization switches of this invention are described in terms of the SCSI protocol. This is because many storage area networks in commerce run a SCSI protocol to access storage sites. Frequently, the storage area network employs fibre channel (FC-PH (ANSI X3.230-1994, Fibre channel—Physical and Signaling Interface) as a lower level protocol and runs IP and SCSI on top of fibre channel. Note that the invention is not limited to any of these protocols. For example, fibre channel may be replaced with Ethernet, Infiniband, and the like. Further the higher level protocols need not include SCSI. For example, this may include SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the describe procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a device that performs an operation requested by an initiator. For example, a target physical memory disk will obtain or write data as initially requested by a host initiator. Note that while the host initiator may provide instructions to read from or write to a "virtual" target having a virtual address, a virtualization switch of this invention must first convert those instructions to a physical target address before instructing the target.

Targets may be divided into physical or virtual "logical units." These are specific devices addressable through the target. For example, a physical storage subsystem may be organized in a number of distinct logical units. In this document, hosts view virtual memory as distinct virtual logical units. Sometimes herein, logical units will be referred to as "LUNs." In the SCSI standard, LUN refers to a logical unit number. But in common parlance, LUN also refers to the logical unit itself. Central to virtualization is the concept of a "virtualization model." This is the way in which physical storage provided on storage subsystems (such as disk arrays) is related to a virtual storage seen by hosts or other initiators on a network. While the relationship may take many forms and be characterized by various terms, a SCSI-based terminology will be used, as indicated above. Thus, the physical side of the storage area network will be described as a physical LUN. The host side, in turn, sees one or more virtual LUNs, which are virtual representations of the physical LUNs. The mapping of physical LUNs to virtual LUNs may logically take place over one, two, or more levels. In the end, there is a mapping function that can be used by switches of this invention to interconvert between physical LUN addresses and virtual LUN addresses.

Figure 2:
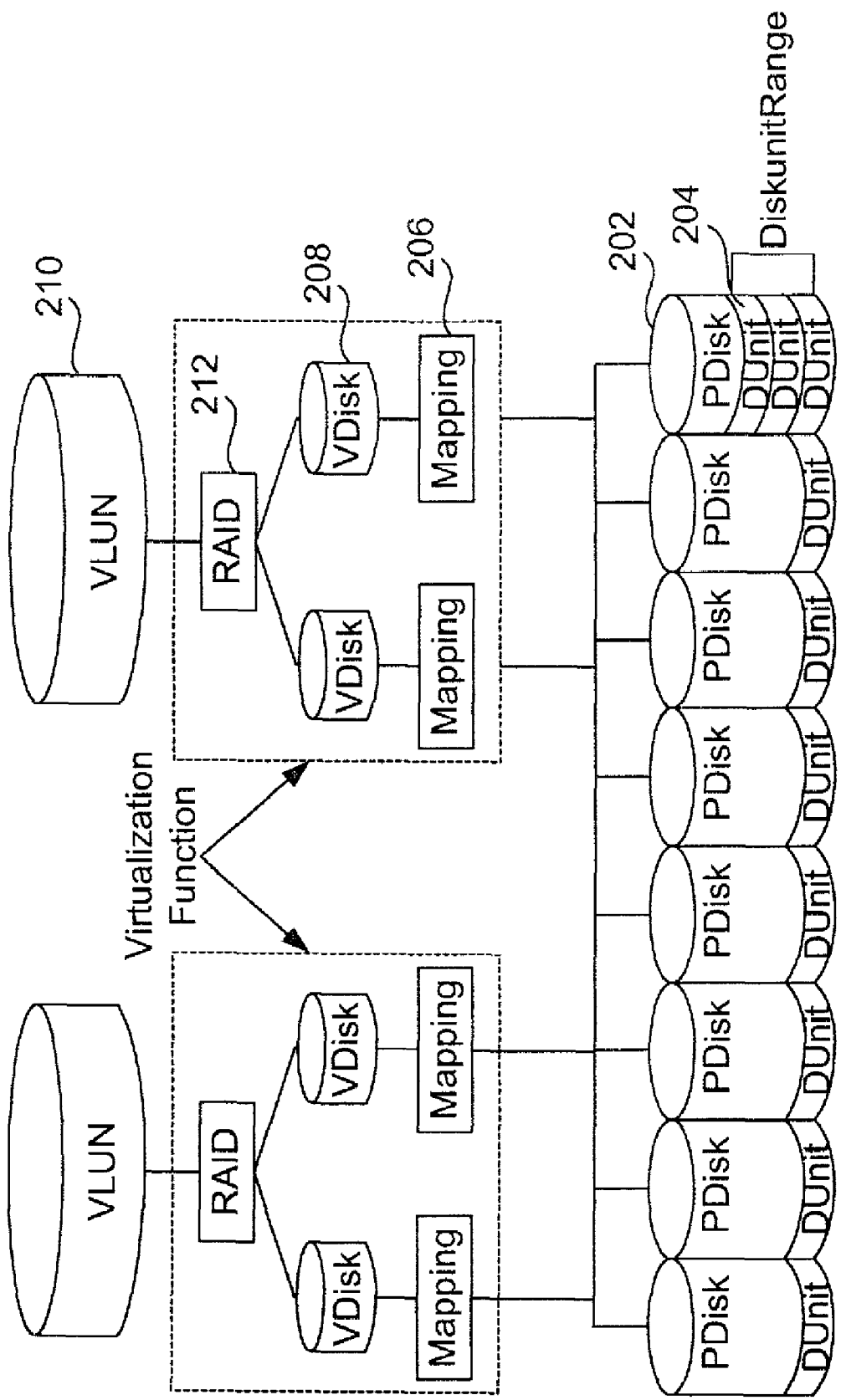
FIG. 2 is a block diagram illustrating a virtualization model that may be implemented in accordance with various embodiments of the invention.

FIG. 2 is a block diagram illustrating an example of a virtualization model that may be implemented within a storage area network in accordance with various embodiments of the invention. As shown, the physical storage of the storage area network is made up of one or more physical LUNs, shown here as physical disks 202. Each physical LUN is a device that is capable of containing data stored in one or more contiguous blocks which are individually and directly accessible. For instance, each block of memory within a physical LUN may be represented as a block 204, which may be referred to as a disk unit (DUnit).

Through a mapping function 206, it is possible to convert physical LUN addresses associated with physical LUNs 202 to virtual LUN addresses, and vice versa. More specifically, as described above, the virtualization and therefore the mapping function may take place over one or more levels. For instance, as shown, at a first virtualization level, one or more virtual LUNs 208 each represents one or more physical LUNs 202, or portions thereof. The physical LUNs 202 that together make up a single virtual LUN 208 need not be contiguous. Similarly, the physical LUNs 202 that are mapped to a virtual LUN 208 need not be located within a single target. Thus, through virtualization, virtual LUNs 208 may be created that represent physical memory located in physically distinct targets, which may be from different vendors, and therefore may support different protocols and types of traffic.

Although the virtualization model may be implemented with a single level, a hierarchical arrangement of any number of levels may be supported by various embodiments of the present invention. For instance, as shown, a second virtualization level within the virtualization model of FIG. 2 is referred to as a high-level VLUN or volume 210. Typically, the initiator device "sees" only VLUN 210 when accessing data. In accordance with various embodiments of the invention, multiple VLUNs are "enclosed" within a virtual enclosure such that only the virtual enclosure may be "seen" by the initiator. In other words, the VLUNs enclosed by the virtual enclosure are not visible to the initiator.

In this example, VLUN 210 is implemented as a "logical" RAID array of virtual LUNs 208. Moreover, such a virtualization level may be further implemented, such as through the use of striping and/or mirroring. In addition, it is important to note that it is unnecessary to specify the number of virtualization levels to support the mapping function 206. Rather, an arbitrary number of levels of virtualization may be supported, for example, through a recursive mapping function. For instance, various levels of nodes may be built and maintained in a tree data structure, linked list, or other suitable data structure that can be traversed.

Each initiator may therefore access physical LUNs via nodes located at any of the levels of the hierarchical virtualization model. Nodes within a given virtualization level of the hierarchical model implemented within a given storage area network may be both visible to and accessible to an allowed set of initiators (not shown). However, in accordance with various embodiments of the invention, these nodes are enclosed in a virtual enclosure, and are therefore no longer visible to the allowed set of initiators. Nodes within a particular virtualization level (e.g., VLUNs) need to be created before functions (e.g., read, write) may be operated upon them. This may be accomplished, for example, through a master boot record of a particular initiator. In addition, various initiators may be assigned read and/or write privileges with respect to particular nodes (e.g., VLUNs) within a particular virtualization level. In this manner, a node within a particular virtualization level may be accessible by selected initiators.

Figure 3A:
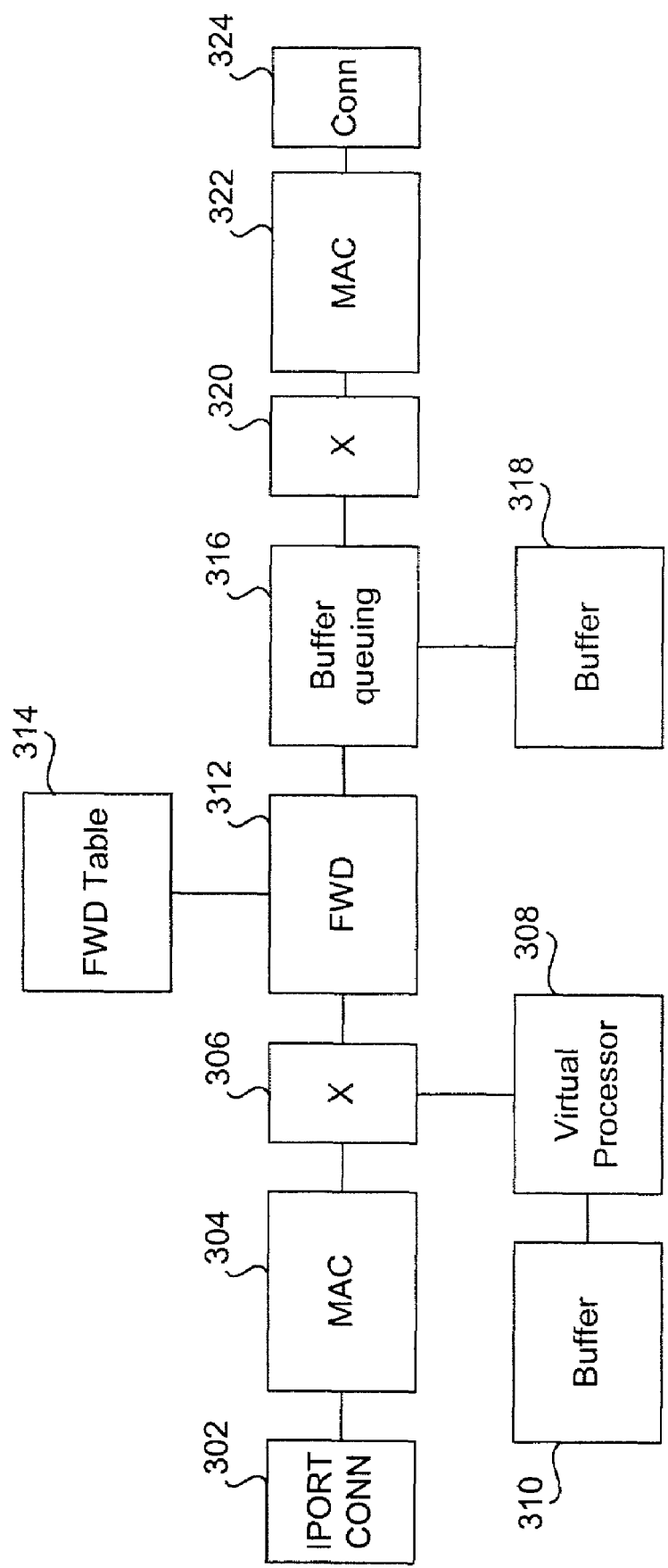
FIG. 3A is a block diagram illustrating an exemplary virtualization switch in which various embodiments of the present invention maybe implemented.

As described above, various switches within a storage area network may be virtualization switches supporting virtualization functionality. FIG. 3A is a block diagram illustrating an exemplary virtualization switch in which various embodiments of the present invention may be implemented. As shown, data or messages are received by an intelligent, virtualization port via a bi-directional connector 302. In addition, the virtualization port is adapted for handling messages on behalf of a virtual enclosure port, as will be described in further detail below. In association with the incoming port, Media Access Control (MAC) block 304 is provided, which enables frames of various protocols such as Ethernet or fibre channel to be received. In addition, a virtualization intercept switch 306 determines whether an address specified in an incoming frame pertains to access of a virtual storage location of a virtual storage unit representing one or more physical storage locations on one or more physical storage units of the storage area network. For instance, the virtual storage unit may be a virtual storage unit (e.g., VLUN) that is enclosed within a virtual enclosure.

When the virtualization intercept switch 306 determines that the address specified in an incoming frame pertains to access of a virtual storage location rather than a physical storage location, the frame is processed by a virtualization processor 308 capable of performing a mapping function such as that described above. More particularly, the virtualization processor 308 obtains a virtual-physical mapping between the one or more physical storage locations and the virtual storage location. In this manner, the virtualization processor 308 may look up either a physical or virtual address, as appropriate. For instance, it may be necessary to perform a mapping from a physical address to a virtual address or, alternatively, from a virtual address to one or more physical addresses.

Once the virtual-physical mapping is obtained, the virtualization processor 308 may then employ the obtained mapping to either generate a new frame or modify the existing frame, thereby enabling the frame to be sent to an initiator or a target specified by the virtual-physical mapping. The mapping function may also specify that the frame needs to be replicated multiple times, such as in the case of a mirrored write. More particularly, the source address and/or destination addresses are modified as appropriate. For instance, for data from the target, the virtualization processor replaces the source address, which was originally the physical LUN address with the corresponding virtual LUN and address. In the destination address, the port replaces its own address with that of the initiator. For data from the initiator, the port changes the source address from the initiator's address to the port's own address. It also changes the destination address from the virtual LUN/address to the corresponding physical LUN/address. The new or modified frame may then be provided to the virtualization intercept switch 306 to enable the frame to be sent to its intended destination.

While the virtualization processor 308 obtains and applies the virtual-physical mapping, the frame or associated data may be stored in a temporary memory location (e.g., buffer) 310. In addition, it may be necessary or desirable to store data that is being transmitted or received until it has been confirmed that the desired read or write operation has been successfully completed. As one example, it may be desirable to write a large amount of data to a virtual LUN, which must be transmitted separately in multiple frames. It may therefore be desirable to temporarily buffer the data until confirmation of receipt of the data is received. As another example, it may be desirable to read a large amount of data from a virtual LUN, which may be received separately in multiple frames. Furthermore, this data may be received in an order that is inconsistent with the order in which the data should be transmitted to the initiator of the read command. In this instance, it may be beneficial to buffer the data prior to transmitting the data to the initiator to enable the data to be re-ordered prior to transmission. Similarly, it may be desirable to buffer the data in the event that it is becomes necessary to verify the integrity of the data that has been sent to an initiator (or target).

The new or modified frame is then received by a forwarding engine 312, which obtains information from various fields of the frame, such as source address and destination address. The forwarding engine 312 then accesses a forwarding table 314 to determine whether the source address has access to the specified destination address. More specifically, the forwarding table 314 may include physical LUN addresses as well as virtual LUN addresses. The forwarding engine 312 also determines the appropriate port of the switch via which to send the frame, and generates an appropriate routing tag for the frame.

Once the frame is appropriately formatted for transmission, the frame will be received by a buffer queuing block 316 prior to transmission. Rather than transmitting frames as they are received, it may be desirable to temporarily store the frame in a buffer or queue 318. For instance, it may be desirable to temporarily store a packet based upon Quality of Service in one of a set of queues that each correspond to different priority levels. The frame is then transmitted via switch fabric 320 to the appropriate port. As shown, the outgoing port has its own MAC block 322 and bi-directional connector 324 via which the frame may be transmitted.

Figure 3B:
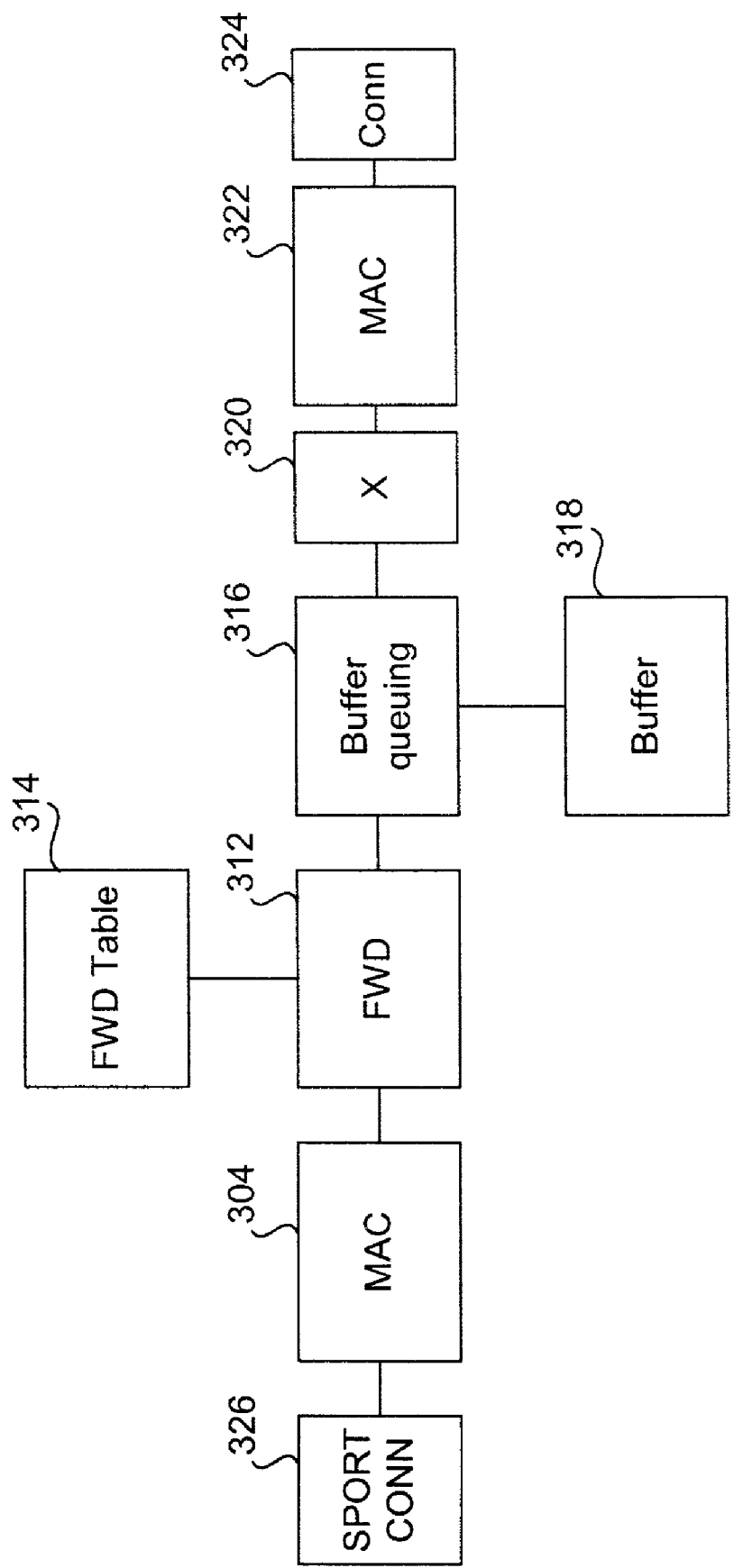
FIG. 3B is a block diagram illustrating an exemplary standard switch in which various embodiments of the present invention may be implemented.

As described above, all switches in a storage area network need not be virtualization switches. In other words, a switch may be a standard switch in which none of the ports implement "intelligent," virtualization functionality. FIG. 3B is a block diagram illustrating an exemplary standard switch in which various embodiments of the present invention may be implemented. As shown, a standard port 326 has a MAC block 304. However, a virtualization intercept switch and virtualization processor such as those illustrated in FIG. 3A are not implemented. A frame that is received at the incoming port is merely processed by the forwarding engine 312 and its associated forwarding table 314. Prior to transmission, a frame may be queued 316 in a buffer or queue 318. Frames are then forwarded via switch fabric 320 to an outgoing port. As shown, the outgoing port also has an associated MAC block 322 and bidirectional connector 324. Of course, each port may support a variey of protocols. For instance, the outgoing port may be an iSCSI port (i.e. a port that supports SCSI over IP over Ethernet), which also supports virtualization, as well as parallel SCSI and serial SCSI.

Although the network devices described above with reference to FIGS. 3A and 3B are described as switches, these network devices are merely illustrative. Thus, other network devices such as routers may be implemented to receive, process, modify and/or generate packets or frames with functionality such as that described above for transmission in a storage area network. Moreover, the above-described network devices are merely illustrative, and therefore other types of network devices may be implemented to perform the disclosed virtualization functionality.

Typically, SCSI targets are directly accessible by SCSI initiators (e.g., hosts). In other words, SCSI targets such as PLUNs are visible to the hosts that are accessing those SCSI targets. Similarly, even when VLUNs are implemented, the VLUNs are visible and accessible to the SCSI initiators. Thus, each host must typically identify those VLUNs that are available to it. More specifically, the host typically determines which SCSI target ports are available to it. The host may then ask each of those SCSI target ports which VLUNs are available via those SCSI target ports.

Within a Fibre channel network, all Fibre channel devices have a World Wide Name (WWN). More specifically, a Node WWN (NWWN) is the WWN of the node that is connected to a particular port. In other words, the NWWN is the WWN of the system, storage device, or subsystem that is connected to the switch port. In addition to a Node WWN, a Port WWN (PWWN) serves as a given name for a particular port. A Fibre channel network ID (FCID) for the particular switch port is used to identify the physical location of a port. Each Fibre channel device may have multiple ports, each of which is uniquely identified by a NWWN and a PWWN.

Unfortunately, there are several disadvantages associated with conventional applications of Fibre channel WWN nomenclature. For instance, a NWWN and a PWWN must be allocated for each port of a Fibre channel device. However, it may be undesirable to allow the NWWN and PWWN of each port to be visible to an initiator such as a host. Moreover, the number of available ports is limited to the number of ports in a particular storage device, subsystem or switch. Similarly, the storage device, subsystem or switch may have a greater number of ports than are needed in a particular storage virtualization scheme. However, virtualization ports are expensive to implement, and it is therefore undesirable to "waste" these intelligent ports. Thus, in accordance with the present invention, virtualization ports may be used on an as-needed basis. In other words, ports may be selected for implementing one or more virtual enclosures, either by binding those ports to virtual enclosure ports or by implementing these ports as trapping ports. As a result, those ports that are most expensive to produce may be used to their maximum capacity.

In one embodiment of the invention, virtualization in a network such as a fibre channel network is implemented without limiting the number of accessible ports in a storage subsystem. Moreover, ports within a SAN may selected and allocated on an as-needed basis for a particular storage virtualization scheme. Various embodiments of the invention are described in further detail below.

Figure 4:
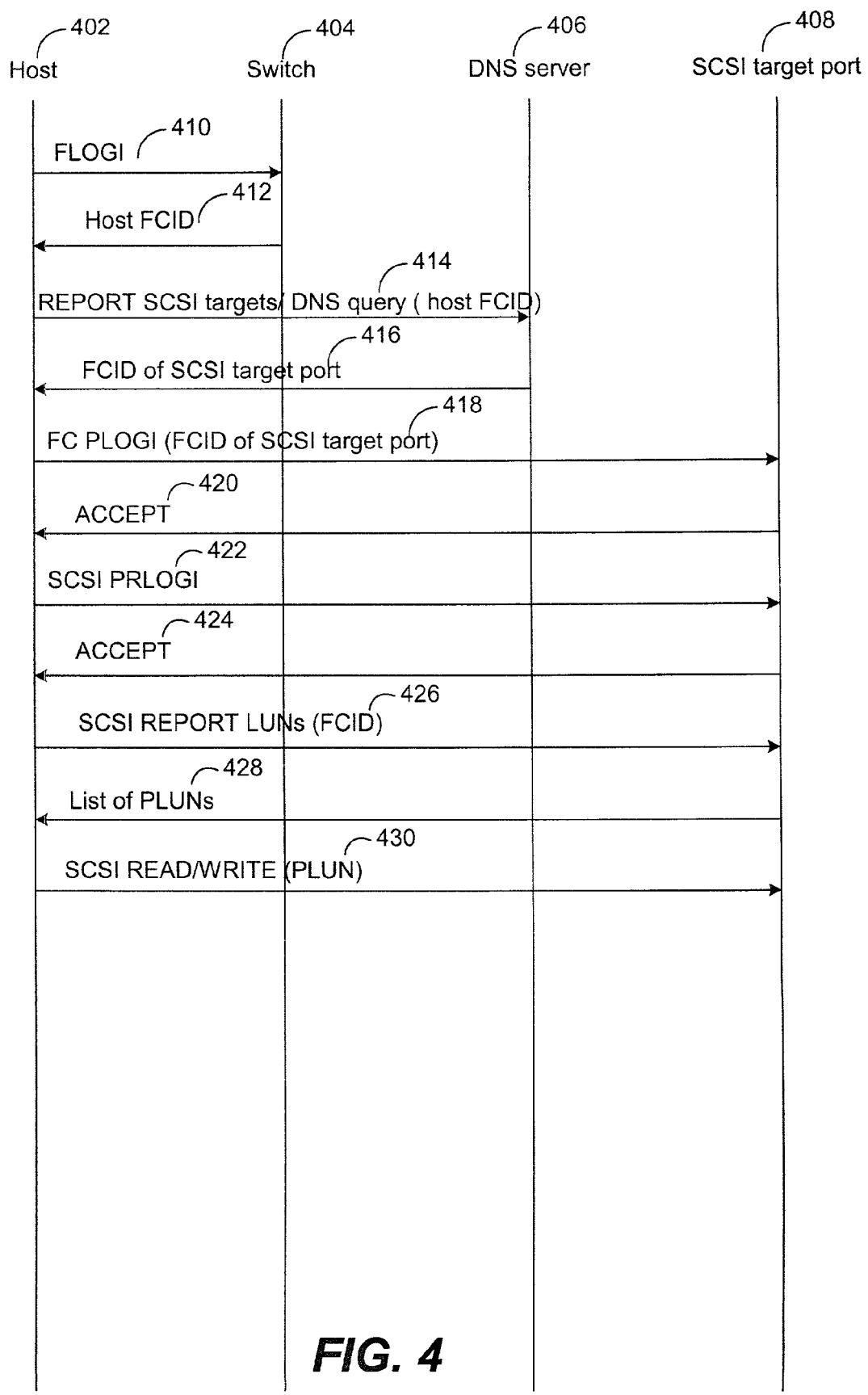
FIG. 4 is a transaction flow diagram illustrating a conventional method of implementing a node world wide name (NWWN) and port world wide name (PWWN) for each SCSI target port.

In order to understand how the present invention may be applied in a fibre channel network, it is helpful to illustrate a conventional application of WWN nomenclature in a Fibre channel network. FIG. 4 is a transaction flow diagram illustrating a conventional method of implementing a node world wide name (NWWN) and port world wide name (PWWN) for each SCSI target port. As shown, interactions between a host 402, switch 404, Domain Name System (DNS) server 406 and SCSI target port 408 are represented by corresponding labeled vertical lines. As shown, in order for a fibre channel node such as a host 402 to establish a logical connection to a fabric switch 404, it performs a fabric login (FLOGI) 410. Unlike many LAN technologies that use a fixed Media Access Control (MAC) address, Fibre channel uses an address identifier, referred to as an FCID, which is dynamically assigned during login. Thus, the switch 404 provides an FCID to the host 402 at 412. Once the host been assigned a host FCID, the host may perform a DNS query of a DNS server 406 via a SCSI REPORT command, which requests the SCSI targets that are available, and therefore visible, to the host at block 414. More specifically, the DNS query determines those SCSI targets that are visible to the host FCID. The FCID of a SCSI target port is then provided by the DNS server 406 to the host 402 at 416.

Once the host has the FCIDs of those SCSI target ports available to it, it sends a Fibre channel process login command to one of the available SCSI target ports (identified by its FCID) at 418. This process login implements a mapping layer, which "maps" Fibre channel to SCSI. Once completed, the SCSI target port 408 sends a Fibre channel accept message at 420. Since Fibre channel is mapped to SCSI, the host can send SCSI commands to the SCSI target.

Now that the host 402 can send SCSI commands to the SCSI target port 408, it performs a SCSI process login at 422 by sending a SCSI process login command to the SCSI target port 408. The SCSI target port 408 then sends a SCSI accept command 424. Communication between the host and the SCSI target via the SCSI protocol is therefore established. For instance, the host may determine which LUNs are available to it, as well as read and write to those LUNs available to it.

Since the host 402 knows which SCSI target ports are available to it and can communicate with each of these ports, it can send a SCSI REPORT LUN command to the SCSI target port 408 to determine those LUNS that are visible to the host FCID at 426. The SCSI target port 408 determines which LUNs are visible to the host FCID and sends a list of LUNs (e.g., PLUNs or VLUNs) at 428. The host 402 may then send SCSI READ and WRITE commands to a particular PLUN or VLUN at 430 via the SCSI target port 408.

Figure 5:
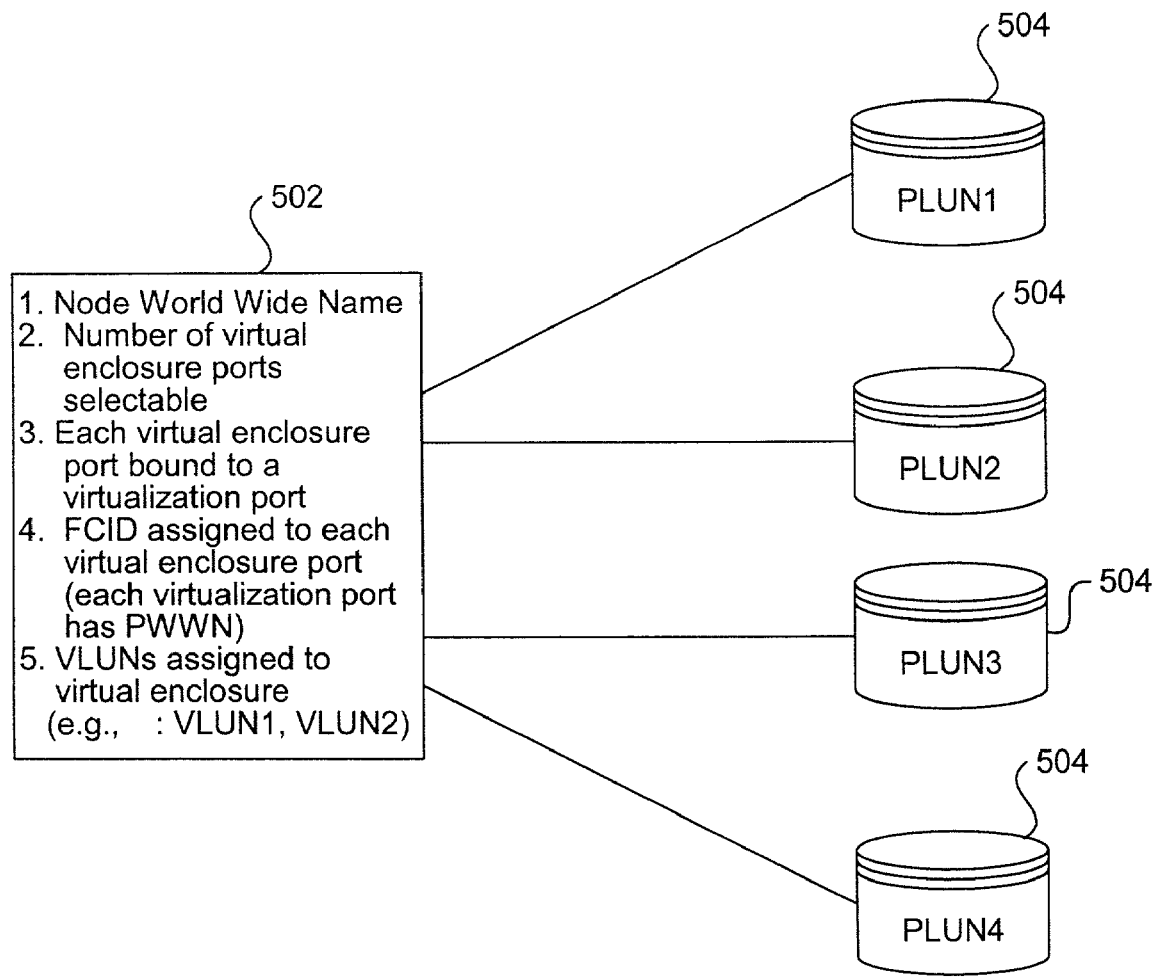
FIG. 5 is a block diagram illustrating an exemplary virtual enclosure in accordance with one embodiment of the invention.

In accordance with various embodiments of the invention, storage virtualization is implemented in a storage area network through the creation of a "virtual enclosure." FIG. 5 is a block diagram of an exemplary virtual enclosure in accordance with one embodiment of the invention. A virtual enclosure 502 is a virtual entity that is that is adapted for "enclosing" or representing one or more virtual storage units. For instance, one or more of the virtual storage units may each comprise a VLUN or other virtual representation of storage on a SAN. As described above, each virtual storage unit represents one or more physical storage locations on one or more physical storage units 504 of the storage area network. Through the creation of a virtual enclosure, various virtualization ports such as those described above may be implemented on an as-needed basis to support virtualization within a particular storage area network. More specifically, the virtual enclosure has one or more "virtual enclosure ports," each of which is associated with a port (e.g., virtualization port) of a network device within the storage area network. For instance, the port of the network device may be instructed, either statically or dynamically, to handle messages addressed to the virtual enclosure port. An address or identifier is also assigned to each of the virtual enclosure ports. Thus, a message (e.g., packet or frame) addressed to a virtual enclosure port may be identified by this address or identifier, thereby enabling a port to intercept and handle messages on behalf of a particular virtual enclosure port. For instance, a FCID may be assigned to each of the virtual enclosure ports for use in a fibre channel network, or with various fibre channel devices within a network such as a SAN. In this manner, a virtual enclosure is created for representing one or more virtual storage units.

Within a SAN, it is possible to create different virtual SANs (VSANs). One method of implementing virtual storage area networks (VSANs) within a single storage area network is described in further detail with reference to U.S. patent application Ser. No. 10.034,160, entitled "Methods and Apparatus for Encapsulating a Frame for Transmission in a Storage Area Network," Edsall, et al., filed on Dec. 26, 2001, which is incorporated herein by reference for all purposes. In other words, it may be desirable or necessary to distribute physical storage units among different VSANs. Accordingly, when the virtual enclosure ports are bound to virtualization ports, these selected virtualization ports may be distributed among multiple VSANs.

Each virtual enclosure may have any number of virtual enclosure ports. In other words, it may be desirable to enable the number of virtual enclosure ports to be selectable. For instance, a system administrator responsible for creating and maintaining the virtual enclosure definitions may select the appropriate number of virtual enclosure ports. It is important to note that the number of virtual enclosure ports within a virtual enclosure is not limited by the number of ports within a particular network device within the storage area network. More specifically, each virtual enclosure port is associated with a port of a network device within the storage area network. In other words, the virtual enclosure ports of a single virtual enclosure may be simultaneously associated with ports (e.g., virtualization ports) of multiple, different network devices within the storage area network rather than a single network device. In addition, a single port of a network device such as a virtualization port may be simultaneously associated with or bound to multiple virtual enclosure ports. Accordingly, the number of ports that are available for virtualization of virtual storage units is virtually unlimited.

As described above, an address or identifier is assigned to each of the virtual enclosure ports. Theoretically, this address or identifier may be an address or identifier that has been previously assigned to the port of the storage area network that is later associated with the virtual enclosure port. However, since a single virtualization port may be bound to multiple virtual enclosure ports, an address or identifier previously assigned to the port (e.g., virtualization port) will not uniquely identify a virtual enclosure port. Thus, the address or identifier is assigned to the virtual enclosure port to uniquely identify the virtual enclosure port. At that time, the address or identifier is provided to the virtualization port that is associated with the virtual enclosure port. In accordance with one embodiment, the virtual enclosure is used in a fibre channel network, and therefore each fibre channel device has a NWWN. This nomenclature is leveraged in accordance with various embodiments of the invention to enable a virtual enclosure to be implemented. Thus, both a NWWN and a PWWN together may be used as an address or identifier to uniquely identify a virtual enclosure port. More particularly, a NWWN is associated with the virtual enclosure. In addition, a PWWN is assigned to each virtual enclosure port. The NWWN and PWWN together identify the virtual enclosure port until it is assigned an address or identifier such as an FCID.

Once the virtual enclosure is created, one or more virtual storage units may be assigned to the virtual enclosure. As described above, each of the virtual storage units may be a VLUN or other virtual representation of storage on the storage area network. In this manner, the virtual enclosure "encloses" those virtual storage units, thereby requiring a host to access those virtual storage units via the virtual enclosure. In this manner, the VLUNS may be "hidden" from the host. In other words, by accessing a PWWN, the host merely has access to the virtual enclosure rather than a specific device or VLUN. More specifically, the VLUNs appear as logical units behind a set of virtual enclosure ports. Thus, the PLUNs that are used to create the VLUNs are hidden from the host.

Figure 6:
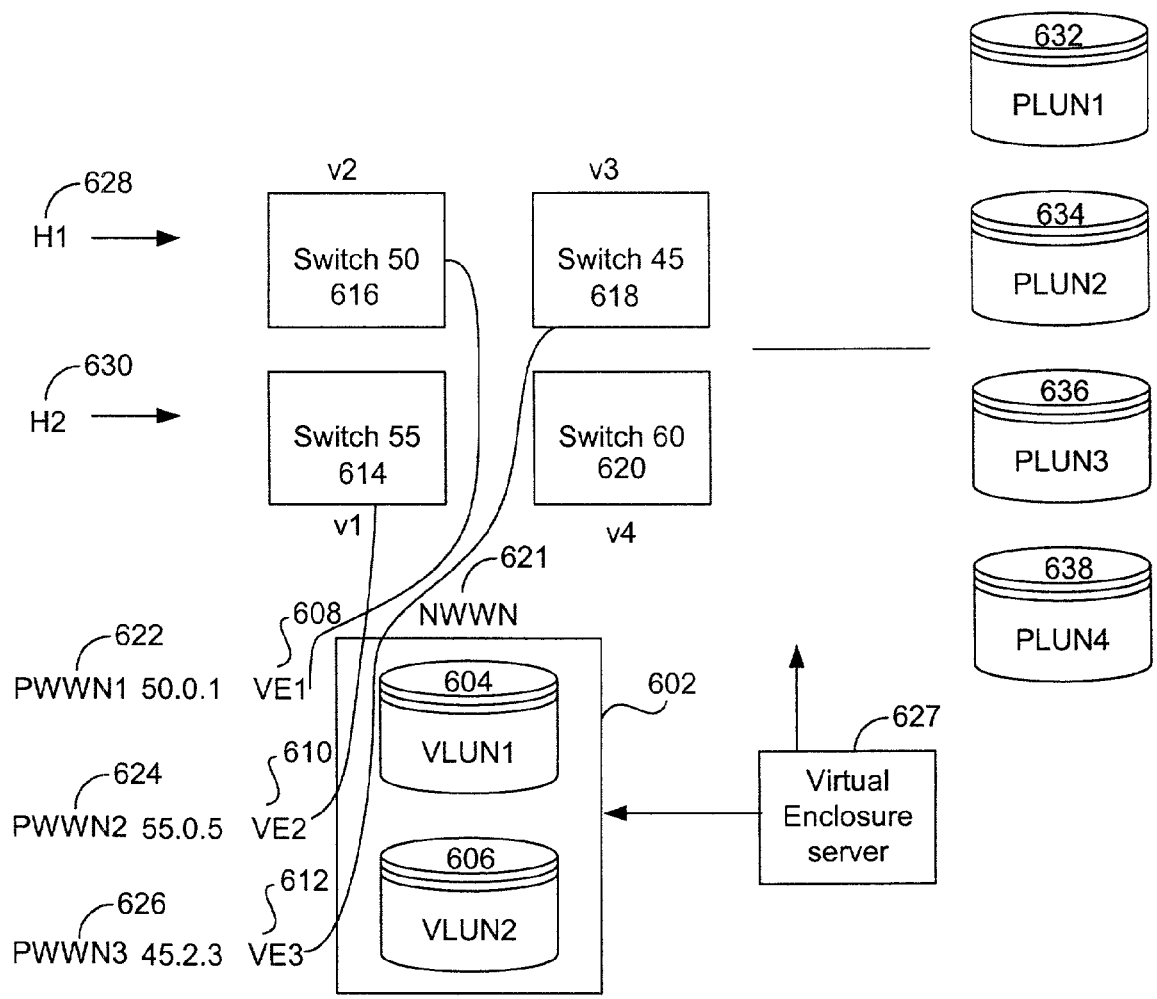
FIG. 6 is a diagram illustrating an exemplary system in which a virtual enclosure is implemented through the binding of the virtual enclosure ports to various virtualization ports in accordance with various embodiments of the invention.

As described above, a storage area network may be implemented with virtualization switches adapted for implementing virtualization functionality as well as standard switches. Each virtualization switch may include one or more "intelligent" virtualization ports as well as one or more standard ports. FIG. 6 is a diagram illustrating an exemplary system in which a virtual enclosure is implemented through the binding of the virtual enclosure ports to various virtualization ports in accordance with various embodiments of the invention. As shown, a virtual enclosure 602 "encloses" two virtual storage units, VLUN1 604 and VLUN2 606. In this example, the virtual enclosure 602 has three virtual enclosure ports, VE1 608, VE2 610, and VE3 612. In addition, four network devices within the storage area network are illustrated. More specifically, four virtualization switches 614, 616, 618, and 620 are illustrated. Each of the virtualization switches has one or more virtualization ports as described above with reference to FIG. 3A. However, in order to simplify the illustration, each virtualization switch is shown to have a single virtualization port, labeled v1, v2, v3, and v4, respectively. Each virtualization port has an associated PWWN (not shown). Communication between the switches may be accomplished by an inter-switch link (not shown) between two switches (or two ports).

Each virtual enclosure port is uniquely identified. More specifically, within a fibre channel network, the virtual enclosure 602 is identified by a NWWN 621. In addition, once each virtual enclosure port is associated with a virtualization port, each of the virtual enclosure ports VE1 608, VE2 610, and VE3 612 are further identified by a PWWN as well as its FCID, labeled PWWN1 622, PWWN2 624, and PWWN3 626, respectively. More particularly, the virtual enclosure ports may be identified by the NWWN and PWWN until an FCID is assigned to the virtual enclosure ports. An FCID will be further described below with reference to FIG. 8. As shown, the FCIDs that are assigned also identify the virtualization switch associated with the corresponding virtual enclosure port. This is because in Fibre Channel, a switch is seen as a "domain." Thus, the first byte of the FCID of any port in that switch is the same as the domain ID. For instance, the first byte of the FCID assigned to the first virtual enclosure port VE1 608 identifies the virtualization switch 616, shown as switch 50. Similarly, the first byte of the FCID assigned to the second virtual enclosure port VE2 610 identifies the virtualization switch 614, shown as switch 55, while the first byte of the FCID assigned to the third virtual enclosure port VE3 612 identifies the virtualization switch 618, shown as switch 45.

The creation of a virtual enclosure such as virtual enclosure 602 may be performed by a network device such as a virtual enclosure server 627. The virtual enclosure 602 may be created, for example, by a system administrator. Once created, various VLUNs such as VLUNs 604 and 606 may be assigned to the virtual enclosure 602. Such an assignment may be subsequently modified as necessary to include additional VLUNs, remove VLUNs from the virtual enclosure, or otherwise modify the assignment of VLUNs to the virtual enclosure 602. In addition to creating, modifying and maintaining a virtual enclosure, the virtual enclosure server 627 may also inform the virtualization ports of the virtualization switches of their association with the corresponding virtual enclosure ports. In this manner, the virtualization ports may be notified of their responsibility to intercept and handle packets (or frames) directed to those corresponding virtual enclosure ports.

Once a virtual enclosure has been created, one or more hosts 628, 630 may access data in the storage area network via the virtual enclosure 602. More specifically, the hosts 628, 630 may access various physical storage devices, referred to as physical storage units, corresponding to the virtual storage units, shown here as VLUN1 604 and VLUN2 606. For instance, a host may read data from or write data to various PLUNs 632, 634, 636, 638 within the storage area network by sending packets, frames or messages to a virtual address within a VLUN enclosed by a virtual enclosure (and available to the host via the virtual enclosure port).

Figure 7:
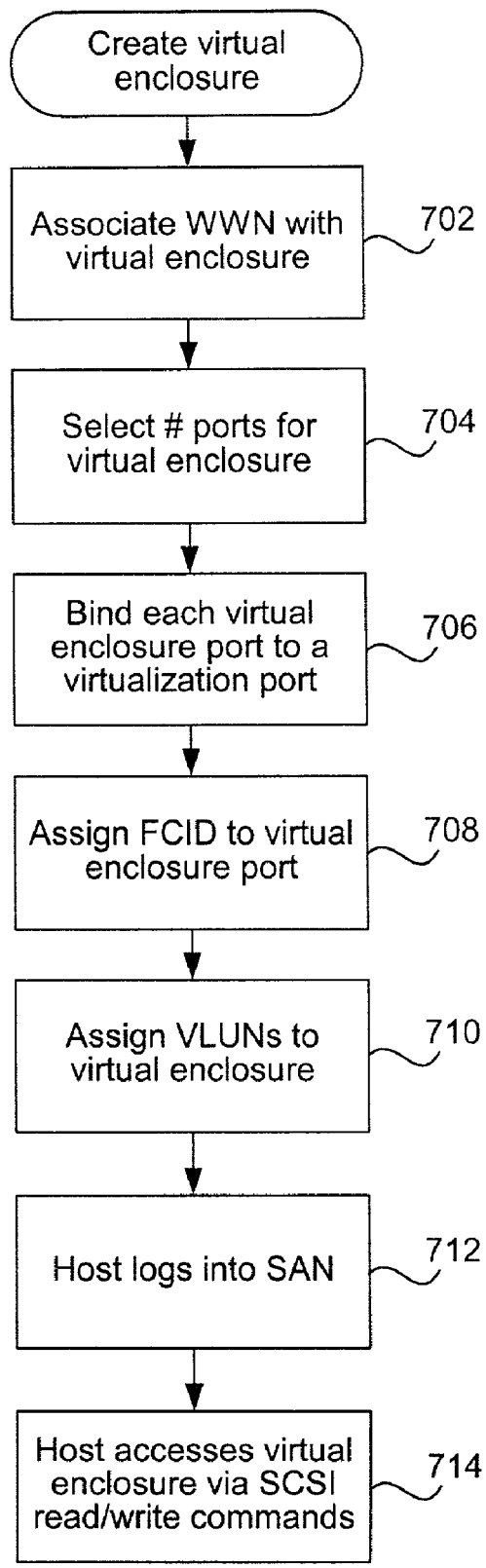
FIG. 7 is a process flow diagram illustrating a method of creating a virtual enclosure in accordance with various embodiments of the invention.

As described above, a virtual enclosure may be created for use in a variety of network environments. FIG. 7 is a process flow diagram illustrating a method of creating a virtual enclosure in accordance with various embodiments of the invention. In this example, the virtual enclosure is for use in a Fibre channel network. Thus, as shown at block 702, a NWWN is associated with the virtual enclosure. In addition, the number of virtual enclosure ports of the virtual enclosure is selected at block 704. Each of these virtual enclosure ports may be identified by a PWWN until they are bound to a virtualization port at block 706 and assigned an FCID at block 708. Once the virtual enclosure is generated, one or more VLUNs are assigned to the virtual enclosure at block 710. Thus, when a host logs into the SAN at block 712, the host may access physical storage units via the virtual enclosure by sending SCSI read and write commands.

Figure 8:
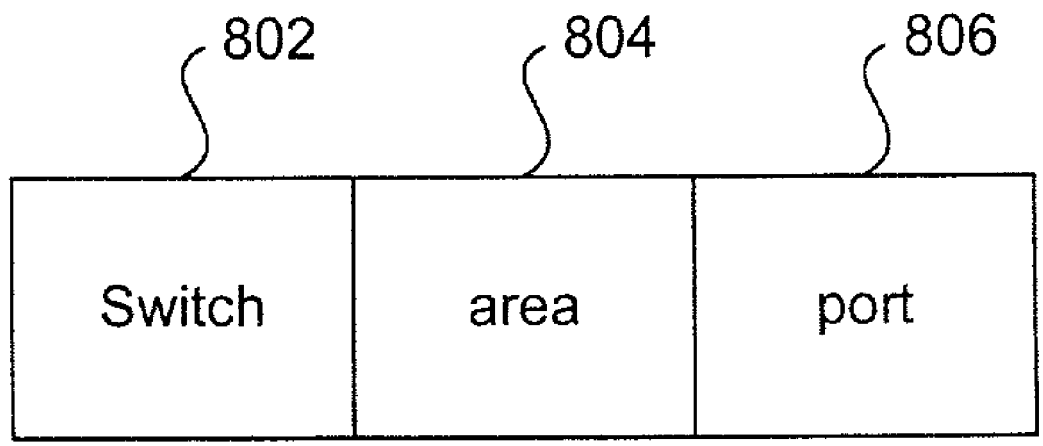
FIG. 8 is a diagram illustrating a conventional fibre channel identifier (FCID) that may be associated with a virtual enclosure port in accordance with various embodiments of the invention.

Within a Fibre channel network, each SCSI target device is assigned a NWWN. Moreover, each SCSI target port is assigned a PWWN. In addition, a Fibre channel identifier (FCID) identifies a physical location of each SCSI target port, and is therefore associated with the PWWN. FIG. 8 is a diagram illustrating a conventional FCID that may be associated with a virtual enclosure port in accordance with various embodiments of the invention. A FCID is a three byte address identifier, which identifies a switch 802 such as a virtualization switch, an area 804 within the network, and a port 806 of the switch 802 such as a virtualization port.

As described above, in order to create a virtual enclosure, each virtual enclosure port is "bound" to a virtualization port. In accordance with various embodiments of the invention, coordination of binding virtual enclosure ports to virtualization ports is performed by a separate network device. For instance, this network device may be the virtual enclosure server responsible for generating a virtual enclosure. In other words, the virtual enclosure server instructs a virtualization port that it is "bound" to a virtual enclosure port and therefore should handle all messages addressed to that virtual enclosure port (that are received by the virtualization port).

In addition to binding a single virtualization port to a virtual enclosure port, it may be desirable to enable additional ports to "trap" messages addressed to the virtual enclosure port. For instance, a virtualization port receiving a message addressed to a virtual enclosure port may be closer to the host than a virtualization port that is "bound" to the virtual enclosure port, and therefore may be better able to provide timely, efficient service. In addition, it may be undesirable to route all messages to a single virtualization port that is bound to a virtual enclosure port, since this may overload a limited number of ports, resulting in ineffective service. Therefore, in accordance with various embodiments of the invention, the virtual enclosure server instructs various virtualization ports to "trap" messages addressed to one or more virtual enclosure ports. In this manner, the power of additional virtualization ports within the SAN to handle messages is leveraged. Accordingly, a virtualization port may service a virtual enclosure even though the virtualization port is not bound to a virtual enclosure port.

A "trapping" virtualization port is preferably an "external" node within the SAN rather than an internal node. In other words, the virtualization port should be directly connected to a host rather than indirectly connected via one or more other ports (e.g., standard or virtualization ports). This direct connection is particularly important since an internal node may receive a message or request from a host, but the internal node may not receive messages from the target that are directed to the host, since the same return path is not guaranteed. As a result, the virtualization port would not be able to complete this "communication loop," and therefore will not have knowledge of whether a host request has been serviced.

Figure 9:
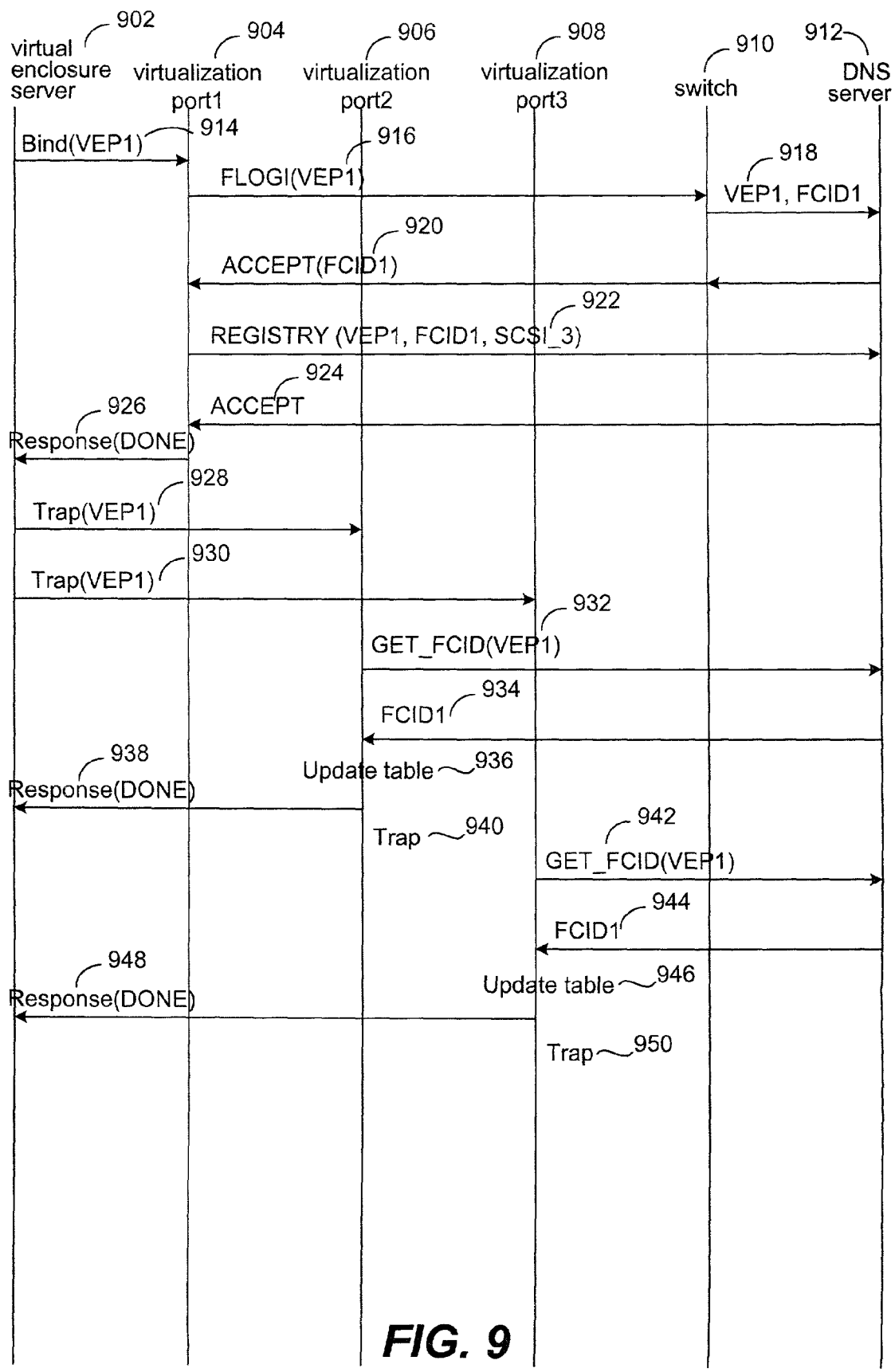
FIG. 9 is a transaction flow diagram illustrating one method of coordinating virtual enclosure binding and trapping functionality of virtualization ports in accordance with various embodiments of the invention.

One method of coordinating virtual enclosure binding and trapping functionality of virtualization ports in accordance with various embodiments of the invention is illustrated in FIG. 9. Steps performed at the virtual enclosure server are represented by vertical line 902, and steps performed at virtualization ports 1-3 are represented by vertical lines 904, 906, and 908, respectively. A DNS server and associated switch are represented by vertical lines 912 and 910, respectively. The DNS server 912 is often included in the switch 910. The virtual enclosure server 902 may send various virtualization messages to various ports within the SAN to enable virtualization of storage within a SAN. For instance, as described above, a virtualization message may be a bind message or a trap message, which identifies the PWWN of a virtual enclosure port. The primary difference between a bind message and a trap message is that a bind message indicates that a FCID is to be dynamically assigned to a virtual enclosure port, while a trap message indicates that the FCID that has previously been assigned to another virtual enclosure port is to be obtained so that messages directed to that FCID may be trapped by the receiving port. As shown at 914, the virtual enclosure server sends a bind message 914 instructing the first virtualization port, virtualization port1 904, to handle all messages directed to the first virtual enclosure port, VEP1 that are received by the virtualization port1 904. Each virtual enclosure port such as VEP1 may be uniquely identified by its PWWN. A virtualization message such as a bind or trap message may further indicate that the receiving virtualization port is to obtain an address or identifier assigned to the virtual enclosure port. For instance, the virtualization message may indicate that the address or identifier is to be obtained from a DNS server, which may be specified or unspecified.

Once the bind message is received, the virtualization port1 904 sends a FLOGI message to the switch 910 at 916 to establish a connection with the switch 910. As described above, a FCID is dynamically assigned during login. Thus, the switch 910 assigns a FCID, FCID1, to the first virtualization port VEP1, which is provided to the DNS server 912 at 918, which then associates the virtual enclosure port1, VEP1 with the FCID FCID1. The switch 910 then sends an ACCEPT message at 920 indicating that the FCID1 is now associated by the DNS server 912 with the first virtual enclosure port, VEP1. In addition, as shown, the ACCEPT message provides the FCID that has been assigned to the virtualization port 904. A virtualization port keeps track of those virtual enclosure ports with which the virtualization port is bound or for which the virtualization port is responsible for trapping messages. In order to maintain this virtual enclosure port information, the virtualization port may then store the FCID, FCID1, in a virtualization port table such as that described below with reference to FIG. 10. A DNS REGISTRY is also performed at 922 to inform the DNS server 912 that VEP1 understands the SCSI protocol. The DNS server then sends an ACCEPT message at 924. A virtualization response is then sent from the virtualization port at 926 to the virtual enclosure server indicating that the virtualization port is now configured to handle messages addressed to the virtual enclosure port of the virtual enclosure. In this example, the virtualization response indicates that the virtualization port is now bound to the virtual enclosure port. In addition, the FCID assigned to the virtual enclosure port VEP1 may also be provided to the virtual enclosure server so that the virtual enclosure server may assign the FCID to the virtual enclosure port. More specifically, the FCID may be provided in the virtualization response. In this manner, the virtual enclosure server obtains the FCIDs of SCSI target ports available to it.

In addition to binding of virtual enclosure ports to virtualization ports within the SAN, the virtual enclosure server 902 may also establish trapping by additional virtualization ports within the SAN as described above. For instance, as shown at 928 a trap message indicating that the virtualization port2 906 is to handle messages addressed to an address or identifier assigned to a particular virtual enclosure port is sent. Since the virtual enclosure server 902 has obtained the FCID assigned to the virtual enclosure port, VEP1, it may be provided in the trap message. Alternatively, the FCID may be obtained from a DNS server, as will be described in this example. In this example, the virtualization port 906 is directed to handle messages addressed to the specified virtual enclosure port (e.g., VEP1) that are received by it. In other words, the virtualization port 906 is instructed to handle messages addressed to the address or identifier assigned to the virtual enclosure port. Similarly, a second trap message is sent at 930 to the virtualization port3 908 indicating that the virtualization port is to handle messages addressed to the first virtual enclosure port.

When the virtualization port2 906 receives the trap message at 928, the virtualization port sends a GET_FCID message at 932 to the DNS server 912 to obtain the address or identifier assigned to the first virtual enclosure port, VEP1. Once it receives the address or identifier at 934, it stores the address or identifier at 936. More specifically, it may update a table such as that described below with reference to FIG. 10. The virtualization port then sends a virtualization response at 938 to the host in response to the virtualization message. For instance, the virtualization response may indicate that the virtualization port has been successfully (or unsuccessfully) configured to handle messages addressed to the virtual enclosure port. The virtualization port may now trap messages addressed to the virtual enclosure port that are received by it as shown at 940.

Similarly, when the virtualization port3 908 receives the trap message at 930, the virtualization port sends a GET_FCID message at 942 to the DNS server 912 to obtain the address or identifier assigned to the first virtual enclosure port, VEP1. Once it receives the address or identifier at 944, it stores the address or identifier at 946. The virtualization port sends a virtualization response at 948 indicating that the virtualization port has been successfully (or unsuccessfully) configured as a trapping port, and begins trapping messages directed to the virtualization port at 950.

Figure 10:
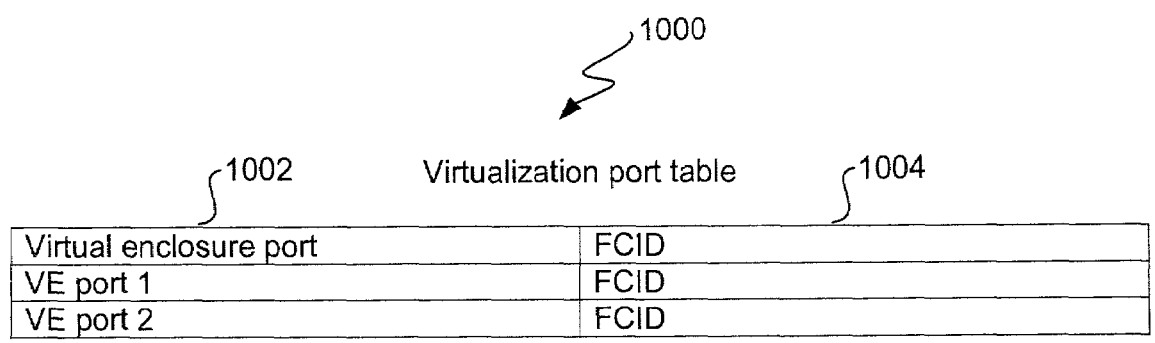
FIG. 10 is a diagram illustrating an exemplary table that may be maintained by a virtualization port indicating FCIDs to be handled by the virtualization port in accordance with various embodiments of the invention.

As described above, a port within a SAN such as a virtualization port may be configured to handle messages on behalf of multiple virtual enclosure ports. More specifically, a single virtualization port may be bound to multiple virtual enclosure ports as well as be configured as a trapping port for multiple virtual enclosure ports. FIG. 10 is a diagram illustrating an exemplary table that may be maintained by a virtualization port indicating FCIDs to be handled by the virtualization port in accordance with various embodiments of the invention. As shown, a virtualization port table 1000 may be maintained by a virtualization port to keep track of those virtual enclosure ports 1002 with which it is bound or for which it is configured to trap messages. For each virtual enclosure port 1002, it maintains the associated FCID. In this manner, the virtualization port may identify those FCIDs for which it is responsible. When a packet is directed to an FCID for which the virtualization port is not responsible, it merely forwards the packet.

Figure 11:
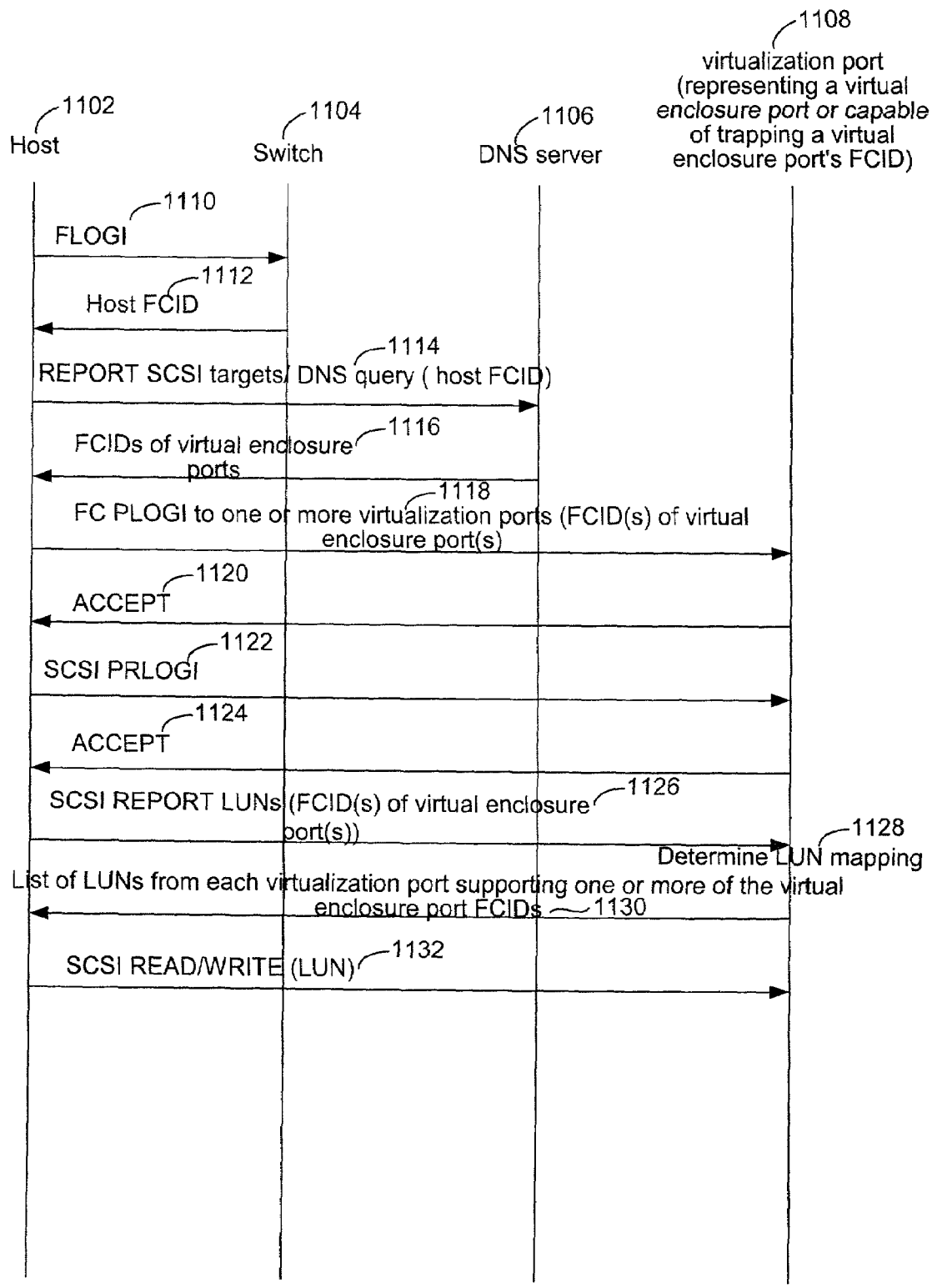
FIG. 11 is a transaction flow diagram illustrating one method of establishing communication between a host and one or more virtualization ports (e.g., virtual enclosure ports, trapping ports) such that the host can access one or more LUNs in accordance with various embodiments of the invention.

Once one or more virtualization ports are configured to handle packets on behalf of a virtual enclosure port (e.g., trapping or bound ports), they may serve as SCSI targets for an initiator such as a host. FIG. 11 is a transaction flow diagram illustrating one method of establishing communication between a host and one or more virtualization ports (e.g., bound to one or more virtual enclosure ports, trapping ports) such that the host can access one or more LUNs in accordance with various embodiments of the invention. As shown, interactions between a host 1102, switch 1104, Domain Name System (DNS) server 1106 and virtualization port 1108 are represented by corresponding labeled vertical lines. As shown, in order for a fibre channel node such as a host 1102 to establish a logical connection to a fabric switch 1104, it performs a fabric login (FLOGI) 1110. As described above, fibre channel uses an address identifier, referred to as an FCID, which is dynamically assigned during login. Thus, the switch 1104 provides an FCID to the host 1102 at 1112. Once the host been assigned a host FCID, the host may perform a DNS query of a DNS server 1106 via a SCSI REPORT command, which requests the SCSI targets that are available, and therefore visible, to the host at block 1114. More specifically, the DNS query determines those SCSI targets that are visible to the host FCID. The FCID of one or more virtual enclosure ports as potential target ports are then provided by the DNS server 1106 to the host 1102 at 1116.

Once the host has the FCIDs of those SCSI target ports available to it, it sends a fibre channel process login command to one or more of the available virtual enclosure SCSI target ports (identified by its FCID) at 1118. As described above, although the packet is addressed to an FCID assigned to a virtual enclosure port, a virtualization port that is bound to the virtual enclosure port or is trapping on behalf of the virtual enclosure port may actually handle these packets. This process login implements a mapping layer, which "maps" fibre channel to SCSI. Once completed, the SCSI virtual enclosure target port(s) 1108 send a fibre channel accept message at 1120. Since Fibre channel is mapped to SCSI, the host can send SCSI commands to the SCSI target virtual enclosure port(s).

Now that the host 1102 can send SCSI commands to the virtual enclosure port(s) 1108, it performs a SCSI process login at 1122 by sending a SCSI process login command to the SCSI target virtual enclosure port 1108. The SCSI virtual enclosure port 1108 then sends a SCSI accept command 1124. Communication between the host and the SCSI target virtual enclosure port via the SCSI protocol is therefore established. For instance, the host may determine which LUNs are available to it, as well as read and write to those LUNs available to it.

Since the host 1102 knows which SCSI targets (and virtual enclosure ports) are available to it and can communicate with each of these ports, it can send a SCSI REPORT LUN command to the SCSI target virtual enclosure port(s) 1108 to determine those LUNs that are visible to the host FCID at 1126. For instance, these LUNs may simply be those VLUNs within the virtual enclosure, or may be a subset of those VLUNs. More specifically, this REPORT message may be sent to the FCIDs assigned to the virtual enclosure ports. The receiving SCSI target virtual enclosure port 1108 determines which LUNs are visible to the host FCID at 1128 and sends a reply message indicating one or more available LUNs (e.g., PLUNs or VLUNs) at 1130. It is important to note that the receiving virtual enclosure port may actually be a virtualization port that is either bound to or trapping on behalf of a virtual enclosure port. Thus, these virtualization ports are also responsible for performing LUN mapping at 1128. One method of LUN mapping will be described in further detail below with reference to FIG. 12. The host 1102 may then send SCSI READ and WRITE commands to a particular VLUN at 1132 via the virtual enclosure port 1108.

Virtualization messages such as trap and bind messages may be implemented in any communication protocol. The protocol that is implemented is preferably a reliable communication protocol, such as TCP sockets or Dynamic Instantiation Protocol (DIP), which runs on top of TCP/IP.

Figure 12:
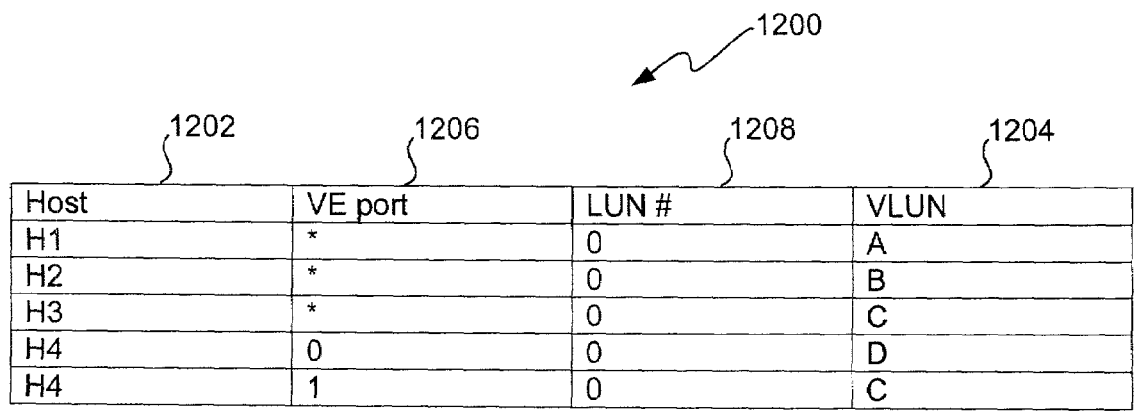
FIG. 12 is a diagram illustrating an exemplary LUN mapping table that may be used at step 1128 of FIG. 11 to perform LUN mapping.

FIG. 12 is a diagram illustrating an exemplary LUN mapping table that may be used at step 1128 of FIG. 11 to perform LUN mapping. As shown, a LUN mapping table 1200 may be used to identify for each initiator (e.g., host) 1202 those VLUNs 1204 of a virtual enclosure that are visible via one or more virtual enclosure ports 1206 (e.g., FCIDs) of the virtual enclosure. For instance, a specified logical unit 1208 such as LUN0 may be used to represent a boot disk. Since it may be desirable to provide a different boot disk for each host, the specified logical unit 1208 is associated with one or more VLUNs 1204 which are made available to the host 1202 via the specified virtual enclosure ports 1206. The virtual enclosure ports 1206 that are available to a particular host 1202 may be specified, or alternatively, a wildcard may be used to indicate that all virtual enclosure ports are available to the host. Thus, when a request for a specified logical unit 1208 is received from the host via one of the virtual enclosure ports, the VLUNs associated with the specified logical unit 1208 are employed to service the request.

Figure 13:
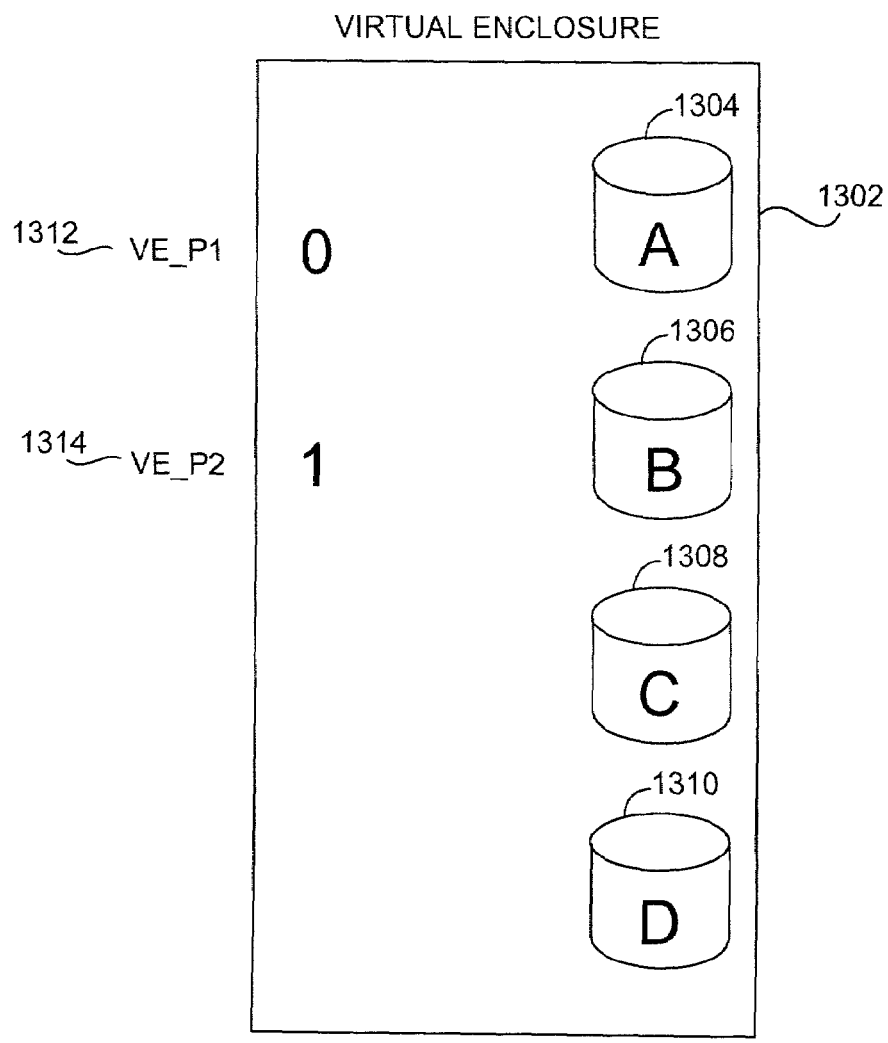
FIG. 13 is a diagram representing a virtual enclosure corresponding to the LUN mapping table of FIG. 12.

FIG. 13 represents a virtual enclosure corresponding to the LUN mapping table of FIG. 12. As shown, virtual enclosure 1302 represents four VLUNS, A 1304, B 1306, C 1308, and D 1310. The virtual enclosure 1302 has two virtual enclosure ports, VEP1 1312 and VEP2 1314. As shown in FIG. 12, host H1 sees LUN0 as VLUN A on any virtual enclosure port, host H2 sees LUN0 as VLUN B on any virtual enclosure port, host H3 sees LUN0 as VLUN C on any virtual enclosure port, host H4 sees LUN0 as VLUN D on virtual enclosure port 0 only, and host H5 sees LUN0 as VLUN C on virtual enclosure port 1 only. In this manner, the identity of the VLUNs is invisible to the host. Accordingly, the present invention provides an additional level of storage virtualization.

The LUN mapping table is preferably maintained at a central location such as the virtual enclosure server. However, in accordance with one embodiment, the LUN mapping table is also be provided as well as periodically distributed to the appropriate network devices (e.g., virtualization ports) within the storage area network. For instance, the LUN mapping table may be distributed at host login to a virtual enclosure port. In other words, the virtualization port is provided a LUN map corresponding to the host that has logged in via the virtual enclosure server.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being applied to frames. However, it should be understood that the invention is not limited to such implementations, but instead would equally apply to packets as well. Moreover, the present invention would apply regardless of the context and system in which it is implemented. Thus, broadly speaking, the coordination of binding and trapping by multiple ports need not be performed using a virtual enclosure server as described above, but may be performed in an alternate manner.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method of implementing storage virtualization in a storage area network, the method comprising:

creating a virtual enclosure, the virtual enclosure being a virtual entity having one or more virtual ports and being adapted for representing one or more virtual storage units, each of the virtual storage units representing one or more physical storage locations on one or more physical storage units of the storage area network, wherein creating the virtual enclosure includes receiving an indication of a number of virtual ports to be included in the virtual enclosure;

associating each of the virtual ports of the virtual enclosure with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations, thereby enabling one or more network devices within the storage area network to be associated with the virtual ports; and assigning an address or identifier to each of the virtual ports;

wherein the step of associating includes sending a message from a first network device to a port of a second network device within the storage area network to instruct the port of the second network device to handle messages addressed to the address or identifier assigned to the associated virtual port that are received by the port of the second network device subsequent to the message sent by the first network device such that the first network device instructs the port of the second network device to act on behalf of the virtual port.

2. The method as recited in claim 1, wherein associating each of the virtual ports of the virtual enclosure with a port of a network device within the storage area network comprises:
associating the virtual ports with ports of one or more network devices within the storage area network.

3. The method as recited in claim 1, further comprising:
assigning one or more virtual storage units to the virtual enclosure.

4. The method as recited in claim 3, wherein the one or more virtual storage units each comprise a VLUN or other virtual representation of storage on the storage area network.

5. The method as recited in claim 1, wherein the virtual enclosure is configured to represent the one or more virtual storage units.

6. The method as recited in claim 1, wherein associating each of the virtual ports of the virtual enclosure with a port of a network device within the storage area network comprises:
associating the virtual ports with ports of two or more network devices within the storage area network.

7. The method as recited in claim 6, further comprising:
associating a single one of the virtual ports with at least one of the ports.

8. The method as recited in claim 6, further comprising:
associating a single one of the virtual ports with two or more of the ports of the two or more network devices.

9. A computer-readable storage medium storing thereon computer-readable instructions for implementing storage virtualization in a storage area network, comprising:
instructions for creating a virtual enclosure, the virtual enclosure being a virtual entity having one or more virtual ports and adapted for representing one or more virtual storage units, each of the virtual storage units representing one or more physical storage locations on one or more physical storage units of the storage area network, wherein creating the virtual enclosure includes receiving information indicating a number of virtual ports to be included in the virtual enclosure;
instructions for associating each of the virtual ports of the virtual enclosure with a port of a network device within the storage area network to create a set of virtual port associations such that the virtual ports of the virtual enclosure are associated with one or more ports of one or more network devices within the storage area network, wherein each of virtual ports is associated with the same port or a different port from other virtual port associations and wherein each of the virtual ports is associated with the same network device or a different network device from other virtual port associations, thereby enabling one or more network devices within the storage area network to be associated with the virtual ports; and
instructions for assigning an address or identifier to each of the virtual ports;
wherein the instructions for associating include instructions for sending a message from a first network device to a port of a second network device within the storage area network to instruct the port of the second network device to handle messages addressed to the address or identifier assigned to the associated virtual port that are received by the port of the second network device subsequent to the message sent by the first network device such that the first network device instructs the port of the second network device to act on behalf of the virtual port.

10. An apparatus for implementing storage virtualization in a storage area network, wherein said apparatus includes a processor and a memory unit, comprising:
means for creating a virtual enclosure, the virtual enclosure being a virtual entity having one or more virtual ports and adapted for representing one or more virtual storage units, each of the virtual storage units representing one or more physical storage locations on one or more physical storage units of the storage area network, wherein creating the virtual enclosure includes receiving information indicating a number of virtual ports to be included in the virtual enclosure;
means for associating each of the virtual ports of the virtual enclosure with a port of a network device within the storage area network to create a set of virtual port associations such that the virtual ports of the virtual enclosure are associated with one or more ports of one or more network devices within the storage area network, wherein each of virtual ports is associated with the same port or a different port from other virtual port associations and wherein each of the virtual ports is associated with the same network device or a different network device from other virtual port associations, thereby enabling one or more network devices within the storage area network to be associated with the virtual ports; and
means for assigning an address or identifier to each of the virtual ports;
wherein the means for associating include means for sending a message from a first network device to a port of a second network device within the storage area network to instruct the port of the second network device to handle messages addressed to the address or identifies assigned to the associated virtual port that are received by the port of the second network device subsequent to the message sent by the first network device such that the first network device instructs the port of the second network device to act on behalf of the virtual port.

11. A network device adapted for implementing storage virtualization in a storage area network, comprising:
a processor; and
a memory, at least one of the processor and the memory being adapted for:
creating a virtual enclosure, the virtual enclosure being a virtual entity having one or more virtual ports and adapted for representing one or more virtual storage units, each of the virtual storage units representing one or more physical storage locations on one or more physical storage units of the storage area network, wherein creating the virtual enclosure includes receiving information indicating a number of virtual ports to be included in the virtual enclosure;
associating each of the virtual ports of the virtual enclosure with a port of a network device within the storage area network such that the virtual ports of the virtual enclosure are associated with one or more ports of one or more network devices within the storage area network, thereby enabling one or more network devices within the storage area network to be associated with the virtual ports; and assigning an address or identifier to each of the virtual ports;

wherein the associating step includes sending a message from a first network device to a port of a second network device within the storage area network to instruct the port of the second network device to handle messages addressed to the address or identifier assigned to the associated virtual poi% that are received by the poi% of the second network device subsequent to the message sent by the first network device such that the first network device instructs the port of the second network device to act on behalf of the virtual port.

12. The network device as recited in claim 11, wherein the storage area network is a virtual storage area network.

13. The network device as recited in claim 11, wherein a Node World Wide Name is associated with the virtual enclosure.

14. The network device as recited in claim 11 wherein a Port World Wide Name is assigned to each of the virtual ports such that the Port World Wide Name is associated with an associated port of a network device within the storage area network.

15. The network device as recited in claim 11, wherein the port of the second network device within the storage area network is a port of a fibre channel device.

16. The network device as recited in claim 11, wherein an FCID is assigned to each of the virtual ports.

17. The network device as recited in claim 11, wherein the number of virtual ports of the virtual enclosure is greater than a number of ports of each network device within the storage area network.

18. The network device as recited in claim 11, wherein associating each of the virtual ports of the virtual enclosure with a port of a network device within the storage area network comprises:

sending a bind message to a port of a network device within the storage area network, thereby binding the port of a network device within the storage area network to one or more of the virtual ports.

19. The network device as recited in claim 18, further comprising:

sending a trap message to one or more additional ports of one or more network devices within the storage area network, thereby instructing the one or more additional ports of one or more network devices within the storage area network to trap messages directed to one of the virtual ports.

20. The network device as recited in claim 11, wherein one or more of the virtual storage units each comprises a VLUN or other virtual representation of storage on the storage area network.

21. A method of performing LUN mapping in a storage area network, the method comprising:

accessing a LUN mapping table having one or more entries, each of the entries identifying an initiator in the storage area network, one or more of a set of one or more virtual ports of a virtual enclosure and associating a specified logical unit with one or more virtual storage units, wherein a number of virtual ports to be included in the virtual enclosure is configurable, each of the virtual storage units representing one or more physical storage locations on one or more physical storage units of the storage area network, wherein the virtual enclosure is a virtual entity adapted for representing the set of one or more virtual storage units and each of the virtual ports is associated with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations, wherein the port of the network device has received a message from another network device instructing the port to handle messages addressed to the associated virtual port that are received by the port of the network device subsequent to the message sent by the another network device such that the another network device instructs the port of the network device to act on behalf of the virtual port; and when a request for the specified logical unit is received from the initiator via one of the associated virtual ports, identifying one of the entries in the LUN mapping table and employing the one or more virtual storage units specified in the entry to service the request.

22. A computer-readable storage medium storing thereon instructions for performing LUN mapping in a storage area network, comprising:

instructions for accessing a LUN mapping table having one or more entries each of the entries identifying an initiator in the storage area network, one or more of a set of one or more virtual ports of a virtual enclosure, and associating a specified logical unit with one or more virtual storage units, wherein a number of virtual ports to be included in the virtual enclosure is configurable each of the virtual storage units representing one or more physical storage locations on one or more physical storage units of the storage area network, wherein the virtual enclosure is a virtual entity adapted for representing the set of one or more virtual storage units and each of the virtual ports is associated with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations, wherein the port of the network device has received a message from another network device instructing the port to handle messages addressed to the associated virtual port that are received by the port of the network device subsequent to the message sent by the another network device such that the another network device instructs the port of the network device to act on behalf of the virtual port; and instructions for identifying one of the entries in the LUN mapping table and employing the one or more virtual storage units specified in the entry to service the request when a request for the specified logical unit is received from the initiator via one of the associated virtual ports.

23. In a first network device, a method of implementing storage virtualization in a storage area network, said first network device includes a processor and a memory unit, the method comprising:

sending a virtualization message to a port of a second network device within the storage area network, the virtualization message instructing the port to handle messages addressed to a virtual port of a virtual enclosure, the virtual enclosure being a virtual entity having one or more virtual ports and being adapted for representing one or more virtual storage units, wherein a number of virtual ports to be included in the virtual enclosure is configurable, each of the virtual storage units representing one or more physical storage locations on one or more physical storage units of the storage area network, wherein each of the virtual ports is associated with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations, wherein the virtualization message indicates that the port is to handle messages addressed to an address or identifier assigned to the virtual port that are received by the port of the second network device subsequent to the virtualization message sent by the first network device such that the first network device instructs the port of the second network device to act on behalf of the virtual port; and receiving a virtualization response from the port of the second network device in response to the virtualization message.

24. The method as recited in claim 23, further comprising: receiving an address or identifier assigned to the virtual port.

25. The apparatus as recited in claim 23, wherein the address or identifier is an FCID.

26. The method as recited in claim 23, wherein each of the virtual ports is associated with a port of a network device within the storage area network such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations.

27. A computer-readable storage medium storing thereon computer-readable instructions for implementing storage virtualization in a first network device of a storage area network, comprising:

instructions for sending a virtualization message to a port of a second network device within the storage area network, the vistualization message instructing the post to handle messages addressed to a virtual port of a virtual enclosure that are received by the port of the second network device subsequent to the vistualization message sent by the first network device such that the first network device instructs the port of the second network device to act on behalf of the virtual port, the virtual enclosure being a virtual entity having one or more virtual ports and being adapted for representing one or more virtual storage units, wherein a number of virtual ports to be included in the virtual enclosure is configurable, each of the virtual storage units representing one or more physical storage locations on one or more physical storage units of the storage area network, wherein each of the virtual ports is associated with a port of a network device within the storage-area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations; and instructions for receiving a virtualization response from the port of the second network device in response to the virtualization message.

28. An apparatus adapted for implementing storage virtualization in a first network device of a storage area network, wherein said apparatus includes a processor and a memory unit, comprising:

means for sending a virtualization message from the first network device to a port of a second network device within the storage area network, the virtualization message instructing the port to handle messages addressed to a virtual port of a virtual enclosure that are received by the port of the second network device subsequent to the virtualization message sent by the first network device such that the first network device instructs the port of the second network device to act on behalf of the virtual port the virtual enclosure being a virtual entity having one or more virtual ports and being adapted for representing one or more virtual storage units, wherein a number of virtual ports to be included in the virtual enclosure is configurable, each of the virtual storage units representing one or more physical storage locations on one or more physical storage units of the storage area network, wherein each of the virtual ports is associated with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations; and means for receiving a virtualization response from the port of the second network device in response to the virtualization message.

29. An apparatus adapted for implementing storage virtualization in a first network device of a storage area network, comprising:

a processor; and a memory, at least one of the processor and the memory being adapted for:

sending a virtualization message from the first network device to a port of a second network device within the storage area network, the virtualization message instructing the port to handle messages addressed to a virtual port of a virtual enclosure that are received by the port of the second network device subsequent to the virtualization message sent by the first network device such that the first network device instructs the port of the second network device to act on behalf of the virtual port the virtual enclosure being a virtual entity having one or more virtual ports and being adapted for representing one or more virtual storage units, wherein a number of virtual ports to be included in the virtual enclosure is configurable, each of the virtual storage units representing one or more physical storage locations on one or more physical storage units of the storage area network, wherein each of the virtual ports is associated with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations, wherein the virtualization message indicates that the port is to handle messages addressed to an address or identifier assigned to the virtual port that are subsequently received by the port; and receiving a virtualization response from the port of the second network device in response to the virtualization message.

30. The apparatus as recited in claim 29, wherein the virtual port is identified by a NWWN and a PWWN.

31. The apparatus as recited in claim 29, wherein the virtualization response indicates that the port is configured to handle messages addressed to the virtual port of the virtual enclosure.

32. The apparatus as recited in claim 29, wherein the virtualization message indicates that the port is to obtain an address or identifier assigned to the virtual port.

33. The apparatus as recited in claim 32, wherein the address or identifier is an FCID.

34. The apparatus as recited in claim 32, wherein the virtualization message is a bind message or a trap message.

35. The apparatus as recited in claim 32, wherein the virtualization response comprises the address or identifier assigned to the virtual port.

36. The apparatus as recited in claim 29, wherein the virtualization message indicates that the port is to obtain an address or identifier assigned to the virtual port from a DNS server.

37. A method of implementing storage virtualization in a first network device of a storage area network. the method comprising:

receiving a virtualization message at a port of the first network device from a second network device within the storage area network, the virtualization message instructing the port to handle messages addressed to a virtual port of a virtual enclosure that are received by the port of the first network device subsequent to the virtualization message sent by the second network device such that the second network device instructs the port of the first network device to act on behalf of the virtual port the virtual enclosure being a virtual entity having one or more virtual ports and being adapted for representing one or more virtual storage units, wherein a number of virtual ports to be included in the virtual enclosure is configurable, each of the virtual storage units representing one or more physical storage locations on one or more physical storage units of the storage area network, wherein each of the virtual ports is associated with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations, wherein the virtualization message indicates that the port is to handle messages addressed to an address or identifier assigned to the virtual port that are subsequently received by the port; and sending a virtualization response from the port of the first network device to the second network device in response to the virtualization message.

38. The method as recited in claim 37, further comprising: obtaining and storing the address or identifier assigned to the virtual port.

39. The method as recited in claim 38, further comprising: sending the address or identifier assigned to the virtual port.

40. The method as recited in claim 38, wherein the address or identifier is an FCID.

41. The method as recited in claim 38, further comprising: handling messages addressed to the address or identifier assigned to the virtual port.

42. The method as recited in claim 37, further comprising: handling messages addressed to the address or identifier assigned to the virtual port.

43. The method as recited in claim 37, further comprising: handling messages addressed to the virtual port of the virtual enclosure.

44. The method as recited in claim 37, further comprising: receiving a report message requesting an identification of one or more of the virtual storage units supported by an address or identifier assigned to one of the virtual ports; sending a reply message identifying one or more of the virtual storage units.

45. The method as recited in claim 44, wherein the address or identifier is an FCID.

46. The method as recited in claim 44, wherein the one or more of the virtual storage units identified in the reply message are those virtual storage units that are visible to an initiator sending the report message.

47. A computer-readable storage medium storing thereon computer readable instructions for implementing storage virtualization in a first network device of a storage area network, comprising:

instructions for receiving a virtualization message at a port of the first network device from a second network device within the storage area network, the virtualization message instructing the port to handle messages addressed to a virtual port of a virtual enclosure that are received by the port of the first network device subsequent to the virtualization message sent by the second network device such that the second network device instructs the port of the first network device to act on behalf of the virtual port, the virtual enclosure being a virtual entity having one or more virtual ports and being adapted for representing one or more virtual storage units, wherein a number of virtual ports to be included in the virtual enclosure is configurable, each of the virtual storage units representing one or more physical storage locations on one or more physical storage units of the storage area network, wherein each of the virtual ports is associated with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations, wherein the virtualization message indicates that the port is to handle messages addressed to an address or identifier assigned to the virtual poi-t that are subsequently received by the port; and instructions sending a virtualization response from the port of the first network device to the second network device in response to the virtualization message.

48. A network device adapted for implementing storage virtualization in a first network device of a storage area network, wherein said network device includes a processor and a memory unit, comprising:

means for receiving a virtualization message at a port of the first network device from a second network device within the storage area network, the virtualization message instructing the port to handle messages addressed to a virtual port of a virtual enclosure that are received by the port of the first network device subsequent to the virtualization message sent by the second network device such that the second network device instructs the port of the first network device to act on behalf of the virtual port, the virtual enclosure being a virtual entity having one or more virtual ports and being adapted for representing one or more virtual storage units, wherein a number of virtual ports to be included in the virtual enclosure is configurable, each of the virtual storage units representing one or more physical storage locations on one or more physical storage units of the storage area network, wherein each of the virtual ports is associated with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations wherein the virtualization message indicates that the port is to handle messages addressed to an address or identifier assigned to the virtual port that are subsequently received by the port; and means for sending a virtualization response from the port of the first network device to the second network device in response to the virtualization message.

49. A network device adapted for implementing storage virtualization in a first network device of a storage area network, comprising:

a processor; and a memory, at least one of the processor and the memory being adapted for:

receiving a virtualization message at a port of the first network device from a second network device within the storage area network, the virtualization message instructing the port to handle messages addressed to a virtual port of a virtual enclosure that are received by the port of the first network device subsequent to the virtualization message sent by the second network device such that the second network device instructs the port of the first network device to act on behalf of the virtual port, the virtual enclosure being a virtual entity having one or more virtual ports and being adapted for representing one or more virtual storage units, wherein a number of virtual ports to be included in the virtual enclosure is configurable, each of the virtual storage units representing one or more physical storage locations on one or more physical storage units of the storage area network, wherein each of the virtual ports is associated with a port of a network device within the storage area network to create a set of virtual port associations such that the virtual ports of the virtual enclosure are associated with one or more ports of one or more network devices within the storage area network, wherein each of the virtual ports is associated with the same port or a different port from other virtual port associations and wherein each of the virtual ports is associated with the same network device or a different network device from other virtual port associations, wherein the virtualization message indicates that the port is to handle messages addressed to an address or identifier assigned to the virtual port that are subsequently received by the port; and sending a virtualization response from the port of the first network device to the second network device in response to the virtualization message.

50. The network device as recited in claim 49, wherein the virtualization message indicates that the port is to obtain an address or identifier assigned to the virtual port.

51. The network device as recited in claim 49, wherein the virtualization message indicates that the port is to obtain an address or identifier assigned to the virtual port from a DNS server.

52. The network device as recited in claim 49, wherein one or more of the virtual storage units comprises a VLUN or other virtual representation of storage on the storage area network.

53. The network device as recited in claim 49, wherein the address or identifier is an FCID.

* * * * *